(12) United States Patent
Hauhoff et al.

(10) Patent No.: US 12,384,443 B2
(45) Date of Patent: Aug. 12, 2025

(54) ADJUSTMENT DEVICE FOR STEERING COLUMNS OF VEHICLES

(71) Applicants: Willi Elbe Gelenkwellen GmbH & Co. KG, Tamm (DE); Schaeffler Technologies AG & Co. KG, Herzogenaurach (DE)

(72) Inventors: Jörg Hauhoff, Altdorf (DE); Thomas Herrlich, Ottobrunn (DE); Fabian Ruh, Erlangen (DE); Philip Wurzberger, Nuremberg (DE); Simon Merz, Herzogenaurach (DE); Ralf Sedlmeier, Pleidelsheim (DE)

(73) Assignees: Willi Elbe Gelenkwellen GmbH & Co. KG, Tamm (DE); Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/577,353

(22) PCT Filed: Jul. 7, 2022

(86) PCT No.: PCT/EP2022/068977
§ 371 (c)(1),
(2) Date: Jan. 8, 2024

(87) PCT Pub. No.: WO2023/281009
PCT Pub. Date: Jan. 12, 2023

(65) Prior Publication Data
US 2024/0239399 A1   Jul. 18, 2024

(30) Foreign Application Priority Data
Jul. 9, 2021 (DE) ................ 10 2021 003 660.3

(51) Int. Cl.
*B62D 1/181* (2006.01)
*B62D 1/19* (2006.01)

(52) U.S. Cl.
CPC ............ *B62D 1/181* (2013.01); *B62D 1/192* (2013.01)

(58) Field of Classification Search
CPC ............................... B62D 1/181; B62D 1/192
See application file for complete search history.

(56) References Cited

U.S. PATENT DOCUMENTS 11,505,235 B2 * 11/2022 Park ................ B62D 1/181
2015/0232117 A1   8/2015 Stinebring et al.
(Continued)

FOREIGN PATENT DOCUMENTS

DE   102018202795 A1 *  8/2019 ............ B62D 1/181
DE   102018126714 A1    4/2020
(Continued)

*Primary Examiner* — Faye M Fleming
(74) *Attorney, Agent, or Firm* — Smartpat PLC

(57) ABSTRACT

An adjustment device for vehicle steering columns has a steering shaft to which a steering element can be attached, and a drive unit for adjusting a length of the steering shaft. The steering shaft has at least two tubes, which engage into each other in a telescoping manner, can be moved relative to each other, and can in each case be driven by a drive unit. The two drive units are arranged next to each other in the region below the adjustment device. If the two tubes are inserted into each other, the adjustment device only has a short length, which is measured in the displacement direction of the tubes. Conversely, if the tubes are extended in a telescoping manner, a very large length adjustment range can be achieved despite the short length in the starting position.

18 Claims, 23 Drawing Sheets

(56) References Cited

U.S. PATENT DOCUMENTS

| | | |
|---|---|---|
| 2018/0001922 A1 | 1/2018 | Gstöhl et al. |
| 2018/0319419 A1 | 11/2018 | Kreutz et al. |
| 2019/0055981 A1 | 2/2019 | McBride et al. |
| 2019/0300042 A1 | 10/2019 | Derocher et al. |
| 2020/0070871 A1 | 3/2020 | Du et al. |
| 2020/0207403 A1 | 7/2020 | Kirmsze |
| 2021/0129896 A1 | 5/2021 | Ryne et al. |
| 2021/0229733 A1 | 7/2021 | Kurokawa et al. |
| 2021/0347405 A1 | 11/2021 | Park |
| 2024/0025469 A1* | 1/2024 | Pichonnat .............. B62D 1/181 |

FOREIGN PATENT DOCUMENTS

| | | |
|---|---|---|
| DE | 102019218938 A1 * | 6/2021 |
| DE | 112019004741 | 6/2021 |
| EP | 3668775 A1 | 6/2020 |
| WO | 2020060303 A1 | 3/2020 |

* cited by examiner

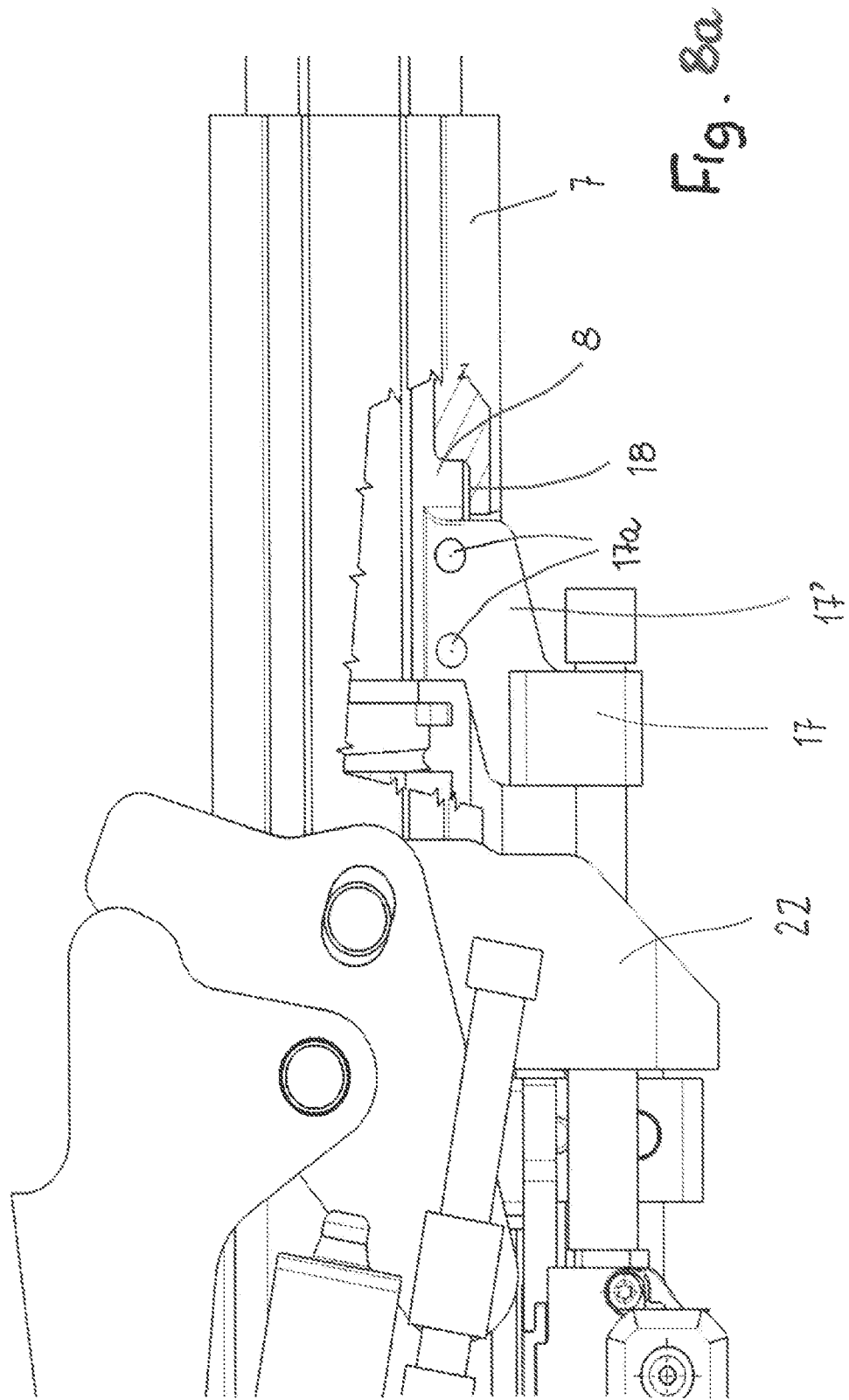

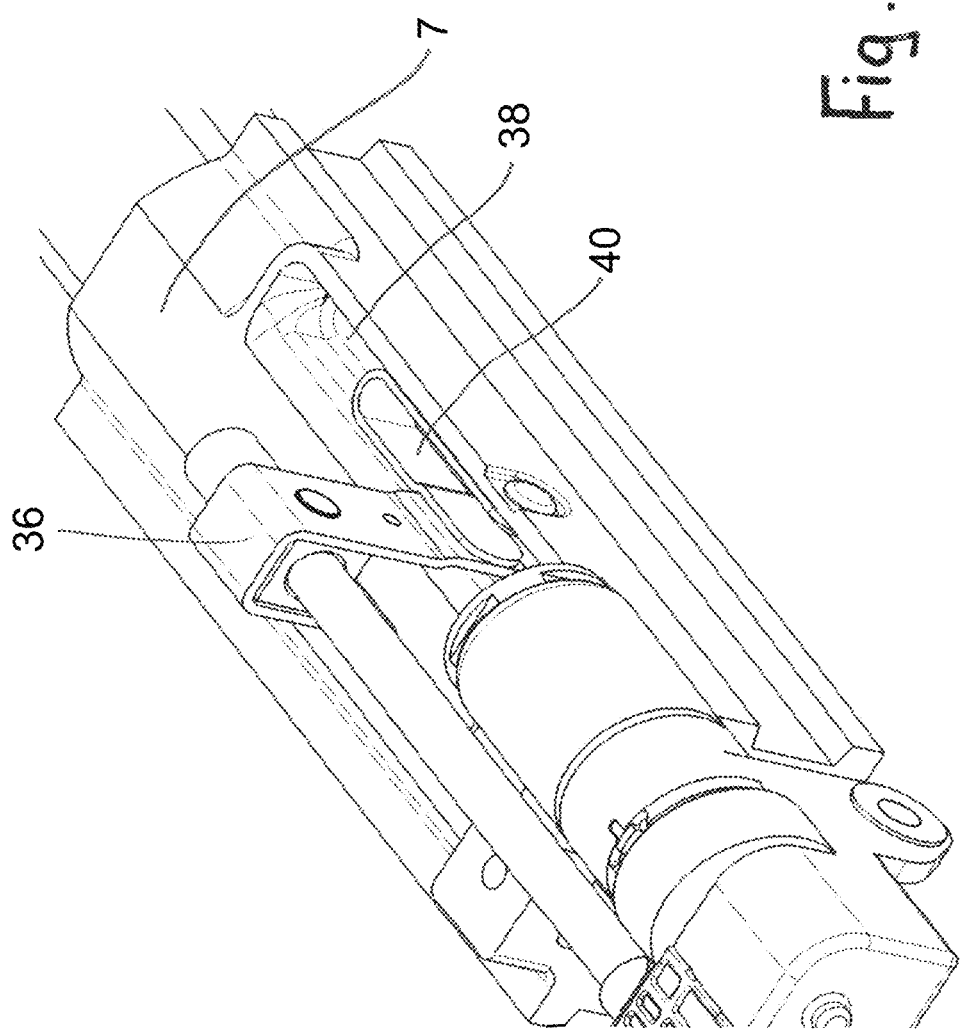

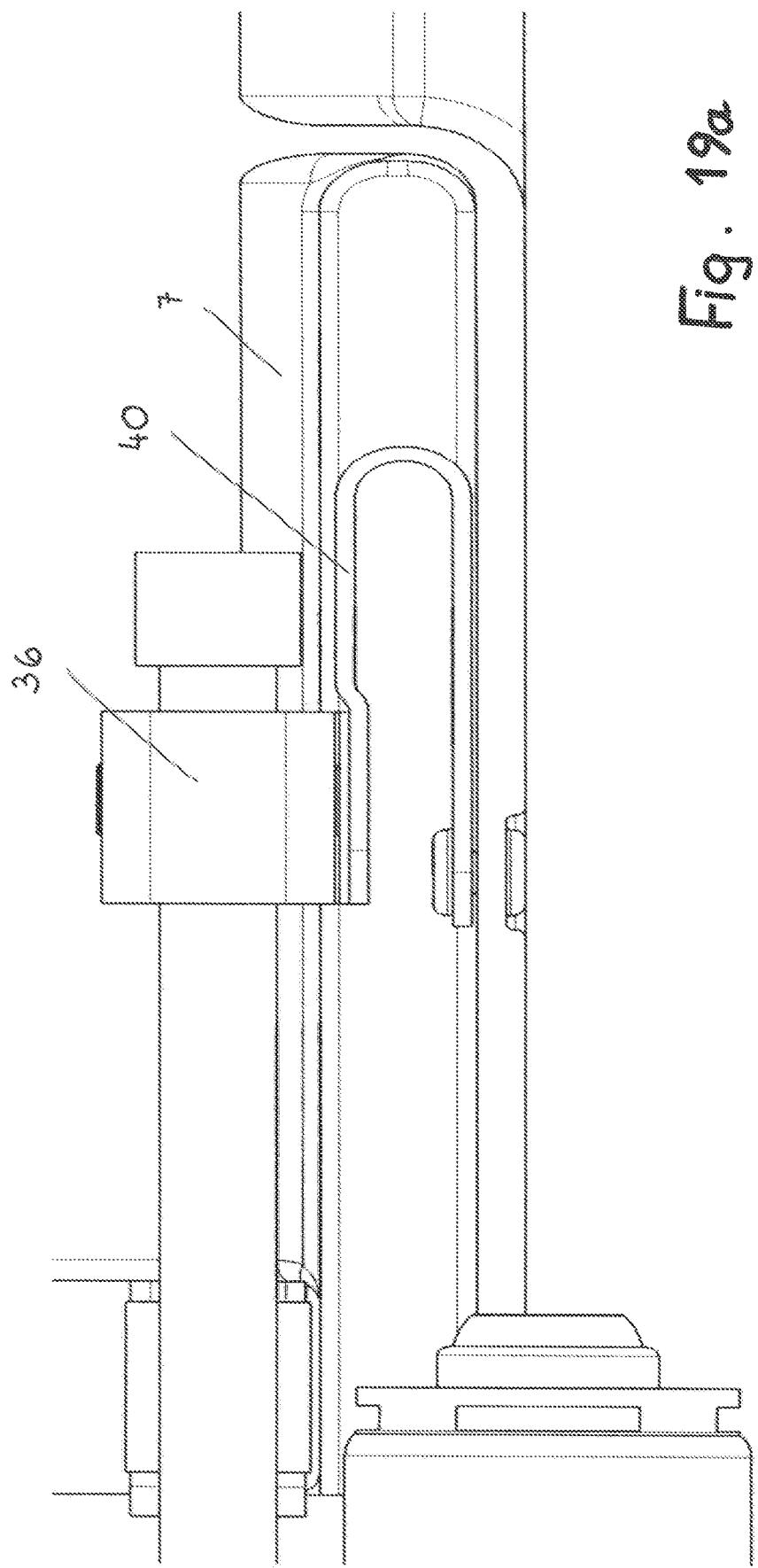

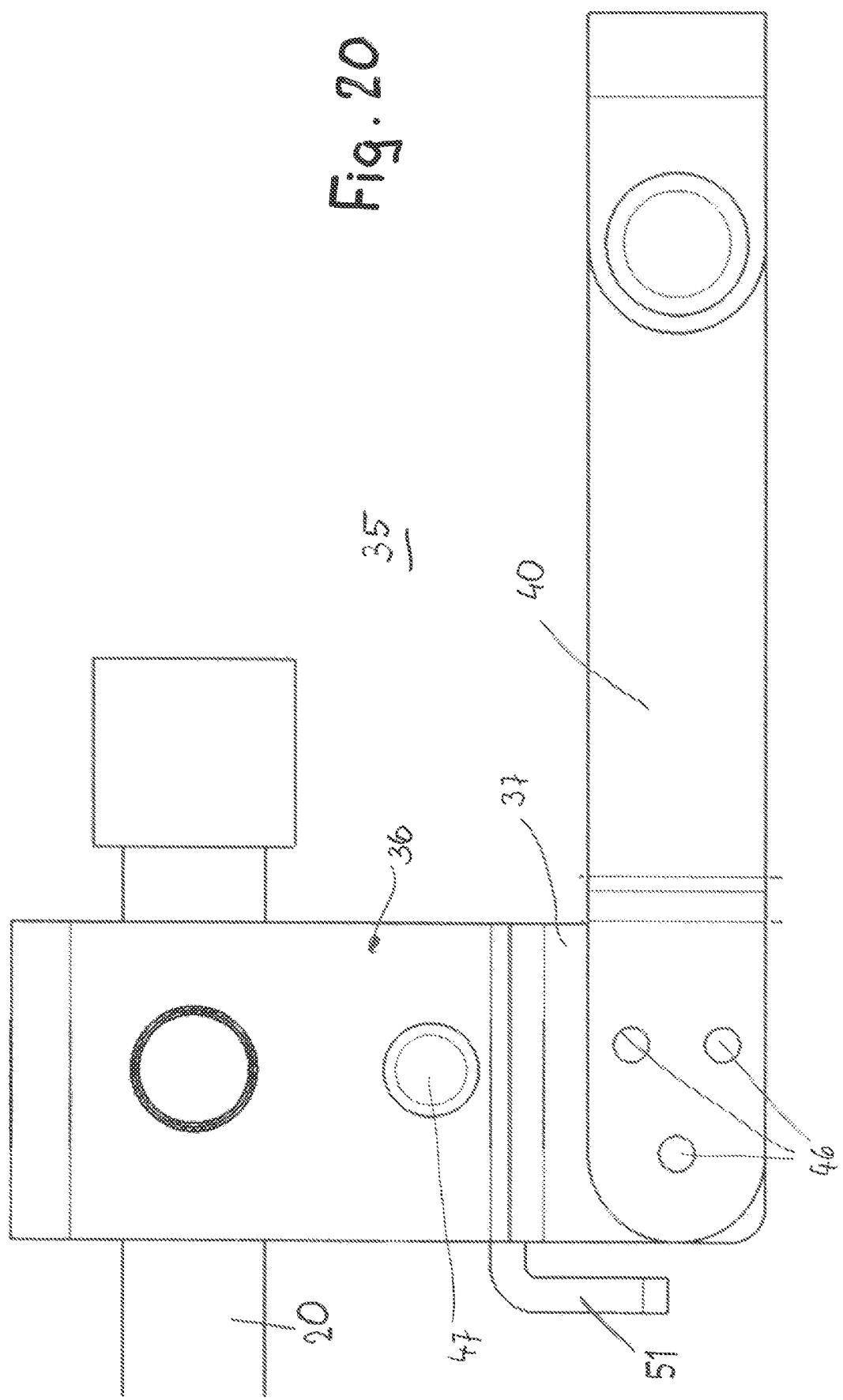

ADJUSTMENT DEVICE FOR STEERING COLUMNS OF VEHICLES

CROSS-REFERENCE TO RELATED APPLICATION

This application is a national stage application, filed under 35 U.S.C. § 371, of International Patent Application PCT/EP2022/068977, filed on Jul. 7, 2022, which claims the benefit of German Patent Application DE 10 2021 003 660.3, filed on Jul. 9, 2021.

BACKGROUND

Adjustment devices for steering columns of vehicles are used to adapt the steering element of a vehicle, such as a steering wheel, to the sitting position of the driver. The steering shaft of the adjustment device can be set at least in its length. There is less and less installation space available for the installation of such adjustment devices, in particular if such adjustment devices are to be installed in electric vehicles. However, this should not impair the functions of the adjustment device.

SUMMARY

The disclosure provides an adjustment device for a steering column of a vehicles that requires little installation space without impairing its function. This is achieved in accordance with the invention by the features as claimed.

The adjustment device is characterized by the fact that its two tubes engage into each other in a telescoping manner and can be displaced relative to each other. If the two tubes are inserted into each other, the adjustment device only has a short length, measured in the displacement direction of the tubes. Conversely, if they are extended in a telescoping manner, a very large length adjustment range can be achieved despite the short length in the starting position. The two tubes can in each case be displaced by a drive unit such that the tubes can be displaced continuously against each other as required. The drive units are located in the region below the adjustment device and are arranged next to each other, as a result of which a very compact design of the adjustment device is achieved.

The two adjustment units advantageously in each case have a threaded spindle that can be driven in rotation. In each case, a drive nut, which is drive-connected to the respective tube, is seated on the threaded spindled. Rotating the threaded spindle displaces the drive nut, as a result of which the tube coupled to it accordingly is adjusted.

In an advantageous embodiment, the threaded spindles of the two drive units for the two tubes are parallel to each other.

The adjustment device is advantageously provided with a sheath tube, into which the two tubes can be displaced. The sheath tube protects the two tubes, such that it is ensured that the tubes can be displaced reliably over a long period of use.

So that the two tubes can be reliably adjusted during the displacement process, the outer tube is advantageously provided on its inner side with at least one axial guide for the inner tube. The axial guide ensures that the two tubes can be displaced smoothly against each other.

A steering spindle, which can be rotatably supported by a bearing arrangement in the inner tube, extends through the inner tube. The steering spindle and the inner tube are firmly connected to each other in the displacement direction via the bearing arrangement, such that the steering spindle is also moved when the inner tube is displaced. The steering spindle is a component of the steering rod and at its end carries the steering element.

The steering spindle protrudes axially from the inner tube within the outer tube in an advantageous manner. A stop device is seated on such protruding part of the inner tube, which has at least one guide element that engages in the axial guide of the outer tube. In this manner, the steering spindle together with the inner tube can be displaced smoothly in relation to the outer tube.

In an advantageous design, the stop device is provided with a grooved sleeve seated on the steering spindle. It has a helically extending groove into which the guide element engages with at least one engagement element. The engagement element is advantageously formed by rolling balls.

The groove of the groove sleeve advantageously extends over an angular range of more than 360°. Due to a relative rotation between the left spindle and the outer tube, the steering spindle together with the inner tube in relation to the outer tube is axially adjusted.

In an advantageous embodiment, the outer tube is drive-connected to the inner tube via at least one crash element. The crash element is advantageously formed by a sheet metal strip, which can be manufactured easily and inexpensively and mounted on the adjustment device.

One end of the crash element is connected to a connecting element, which is connected to the drive nut of the adjustment unit for the outer tube.

The connecting point of the connecting element to the drive nut is advantageously effected via at least one shearing element. In the event of a crash, the connection between the outer tube and the inner tube is broken by shearing off the shearing element.

It is particularly advantageous if the steering shaft can be adjusted not only in length, but also in height. This ensures optimum adaptation of the steering element to the sitting position of the driver.

To adjust the height of the steering shaft, an adjustment unit is provided which is mounted on a bearing support about an axis that is transverse to the longitudinal adjustment direction of the steering spindle. Depending on the pivot direction, the steering shaft can be pivoted upwards or downwards.

Advantageously, a lever is pivotably mounted on the bearing support, which on its part is pivotably connected to the sheath tube. Depending on the pivoting position of the lever relative to the bearing support, the steering shaft is pivoted upwards or downwards.

In an advantageous embodiment, the adjustment unit for adjusting the height of the steering shaft engages on the lever. This pivots the lever in the desired direction using the adjustment unit, in order to move the steering shaft upwards or downwards.

This adjustment unit advantageously has a threaded spindle that can be driven in rotation, with which a drive nut that is coupled to the lever can be adjusted. Thus, via the drive nut, the lever is pivoted in the desired direction.

The invention is explained in more detail with reference to an exemplary embodiment shown in the drawing.

BRIEF DESCRIPTION OF THE DRAWINGS

FIG. 8a shows, in enlarged representation, a section of FIG. 8.

FIG. 18a shows the safety unit in accordance with FIG. 18 in the triggered position.

FIG. 19a is a top view of the safety unit in accordance with FIG. 19.

FIG. 20 is a side view of the safety unit in accordance with FIG. 18.

DETAILED DESCRIPTION

The electric steering column adjustment device described below has a high degree of rigidity and a compact design. Therefore, it can be installed in installation spaces with limited volume. The adjustment device is suitable for semi-autonomous driving with a vehicle with which the steering is not transmitted mechanically to the steerable vehicle wheels by means of a steering element, such as a steering wheel, but is carried out electrically.

The adjustment device has the steering element (not shown), which is fastened for co-rotation to a steering shaft 1. The adjustment device is designed such that the steering element can be set both in the longitudinal direction of the steering shaft 1 and transversely to it in the vertical direction to adapt to the position of the driver.

The steering shaft 1 has a steering spindle 2, to the free end of which the steering element is fastened in a known manner. The steering spindle 2 can be displaced in its longitudinal direction in order to adjust the steering element to different longitudinal positions.

In order to give the driver the feeling of direct steering of the wheels despite the electrical adjustment of the steerable vehicle wheels, the adjustment device can be provided with an actuator 3, which generates a counter-torque when the steering shaft 1 is rotated by means of the steering element. This gives the driver the feeling that he is steering the wheels of the vehicle mechanically.

Figure 10:
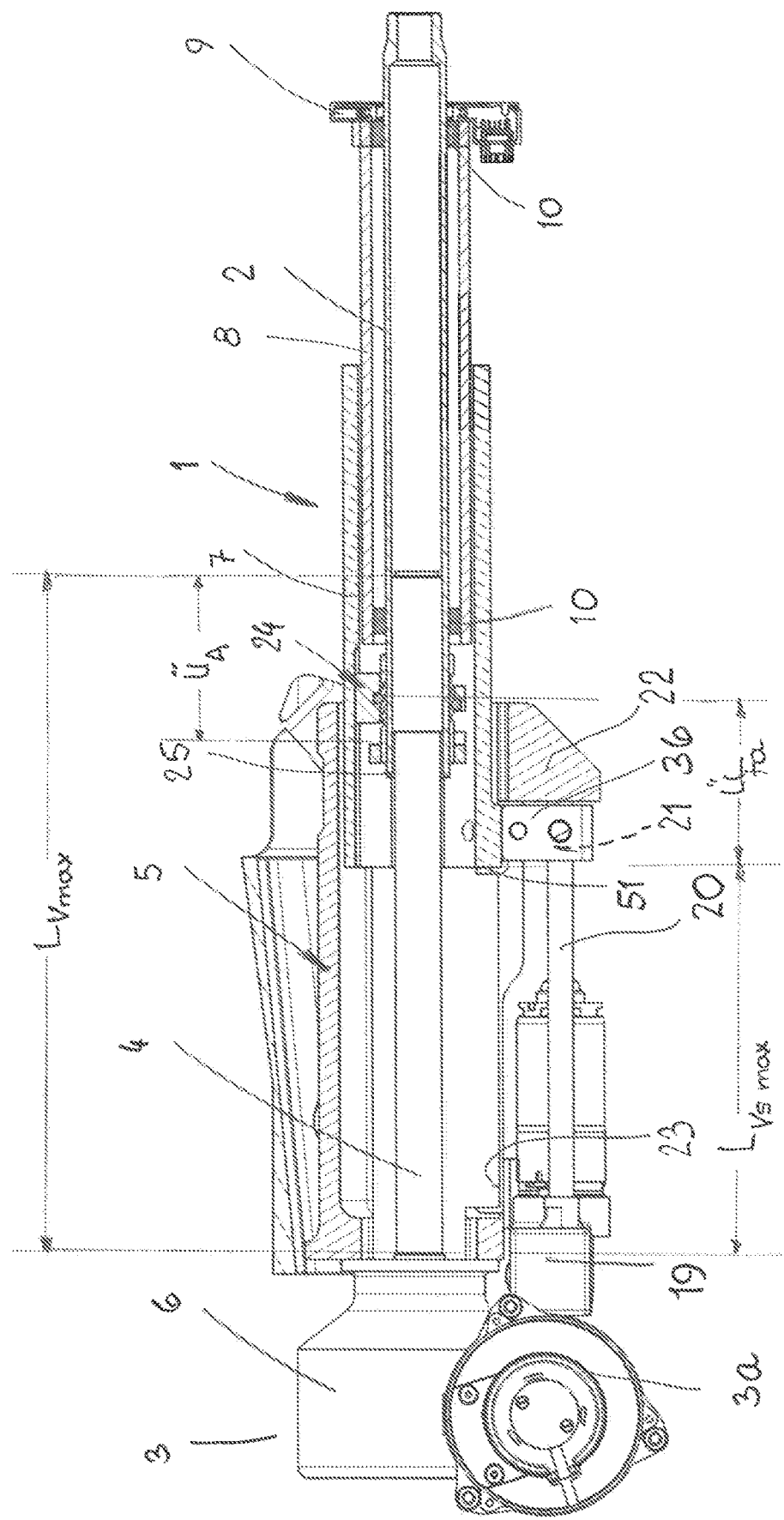
FIG. 10 and FIG. 11 are sectional views showing the steering column adjustment device with the steering spindle extended to different lengths.

The actuator 3 has a drive unit 3a, whose axis extends perpendicularly to the axis of the actuator 3 and that rotatably drives a toothed shaft 4 that projects into a sheath tube 5 (FIG. 10). It is fastened to a housing 6 of the actuator 3.

The sheath tube 5 surrounds a guide tube 7 with clearance, which can be displaced relative to the sheath tube 5. The guide tube 7 on its part surrounds an inner guide tube 8 with radial clearance, into which the steering spindle 2 projects. It is firmly connected to the inner guide tube 8, such that the steering spindle 2 is moved together with the inner guide tube 8 when the length of the steering shaft 1 is adjusted.

An angle sensor 9 is fastened to the free end of the inner guide tube 8 outside the outer guide tube 7, through which the steering spindle 2 projects.

The steering spindle 2 is supported in the inner guide tube 8 by a spindle bearing 10, which is formed, for example, by two axially spaced bearings. They are provided near both ends inside the guide tube 8.

Figure 11:
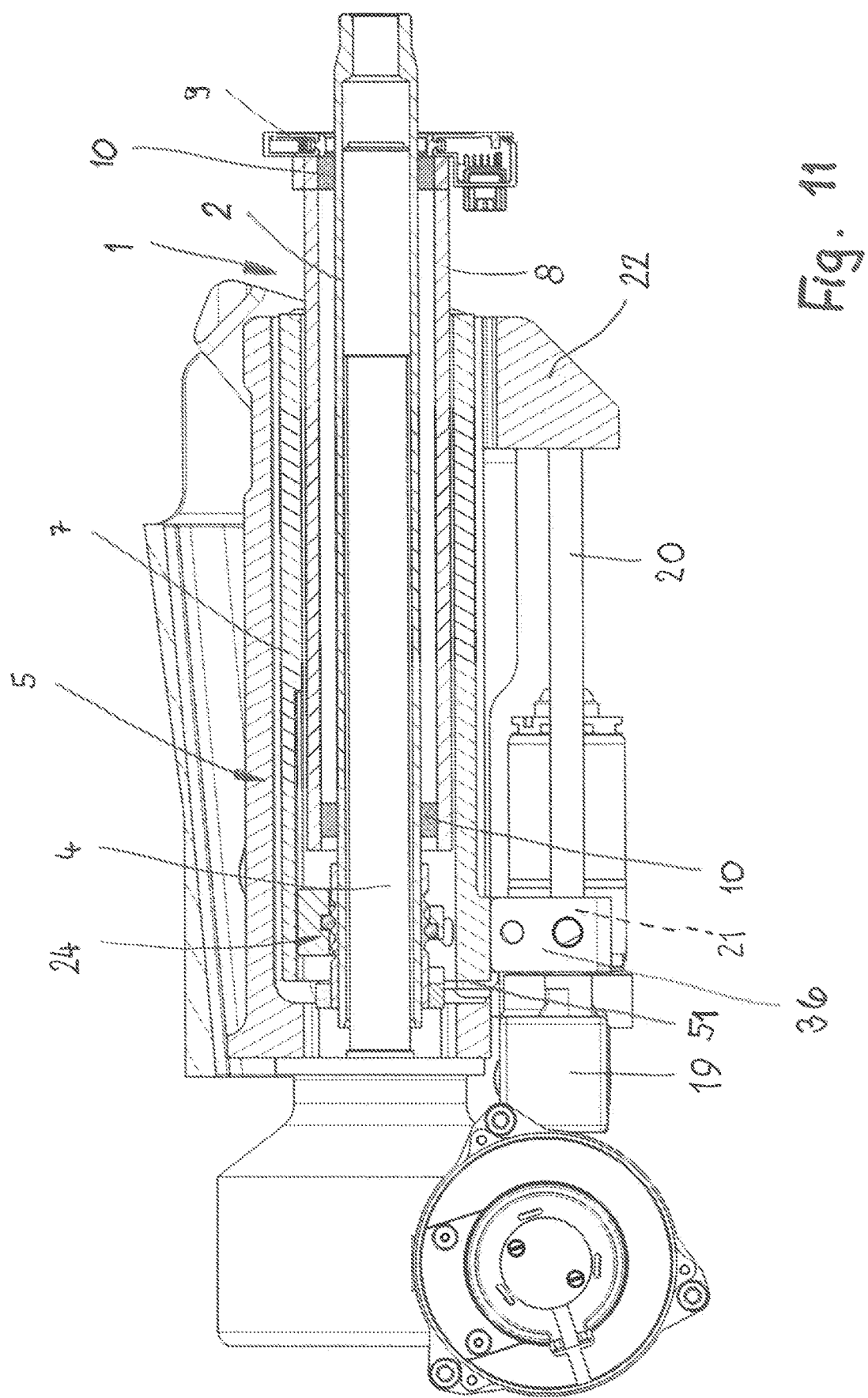

The sheath tube 5 and the two guide tubes 7, 8 together with the steering shaft 2 form a telescopic steering shaft 1. FIG. 10 shows the steering shaft 1 in its maximum extended length, while FIG. 11 shows the steering shaft 1 in the retracted position.

In order to enable a safe telescoping movement, the sheath tube 5 is provided on diametrically opposite sides in each case with a guide strip 11 (FIG. 12), which extends in the axial direction of the sheath tube and engages in a corresponding counter-guide 12 formed by a recess on diametrically opposite regions of the outer guide tube 7. They are provided on the outer side of the outer guide tube 7 and extend axially.

The inner guide tube 8 has diametrically opposed, axially extending guide strips 13 on its outer side, which engage in corresponding axially extending recesses 14 on the inner side of the outer guide tube 7.

Figure 12:
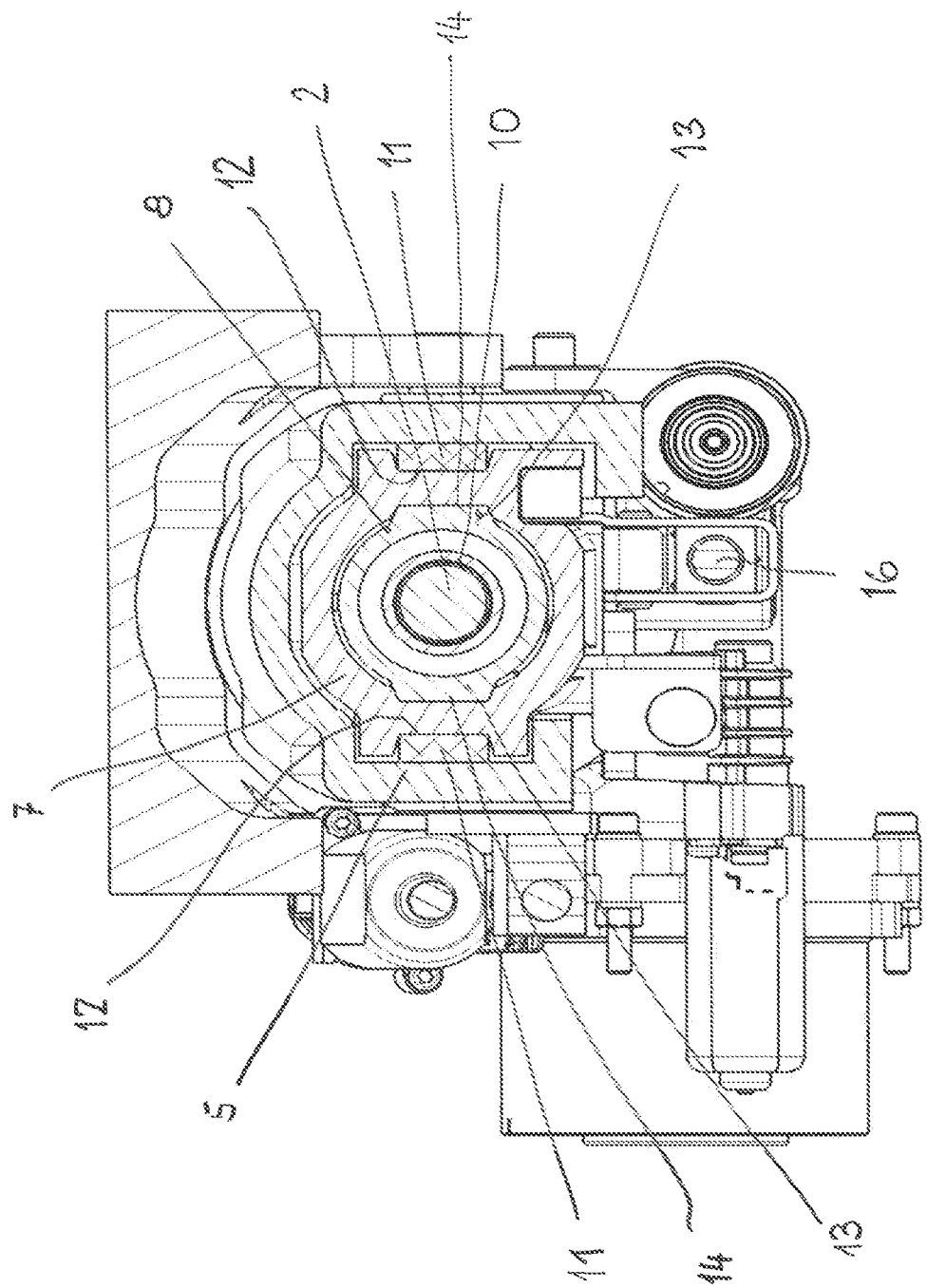
FIG. 12 shows a section along line XII-XII in FIG. 6.

As can be seen in FIG. 12, the guide strips 11, 13 and the recesses 12, 14 are diametrically opposite each other at the same height. In principle, the guide system 11, 13 can be arranged at an angle offset in relation to the guide system 12, 14, for example by 90°.

Figure 1:
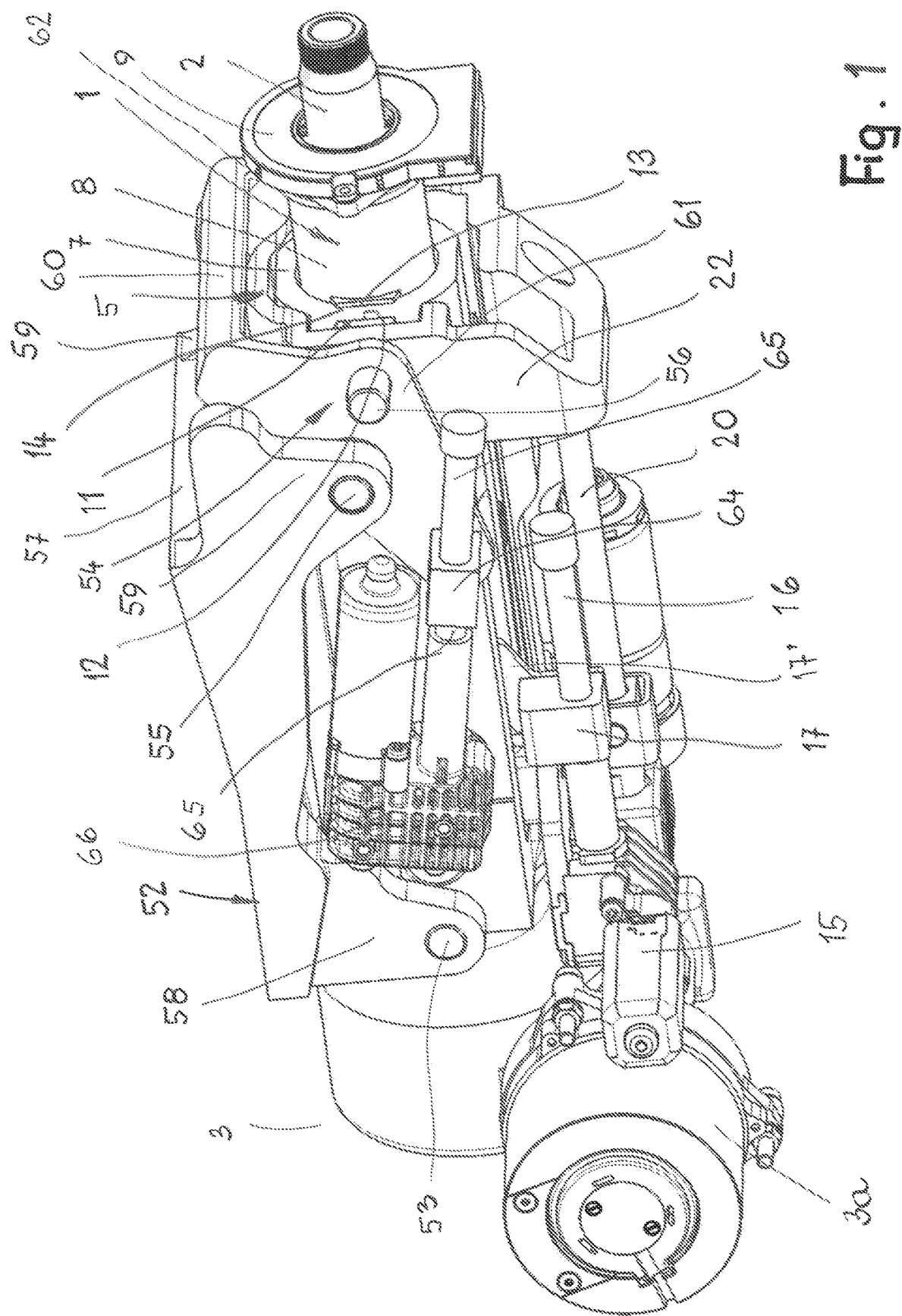
FIG. 1 is a perspective view of a steering column adjustment device in a stowed position.

A length adjustment drive 15 is used to adjust the length of the inner guide tube 8, which has a threaded spindle 16 parallel to the toothed shaft 4, on which a drive nut 17 is seated (FIG. 1). Depending on the direction of rotation of the threaded spindle 16, the drive nut 17 is moved along the threaded spindle 16.

Figure 3:
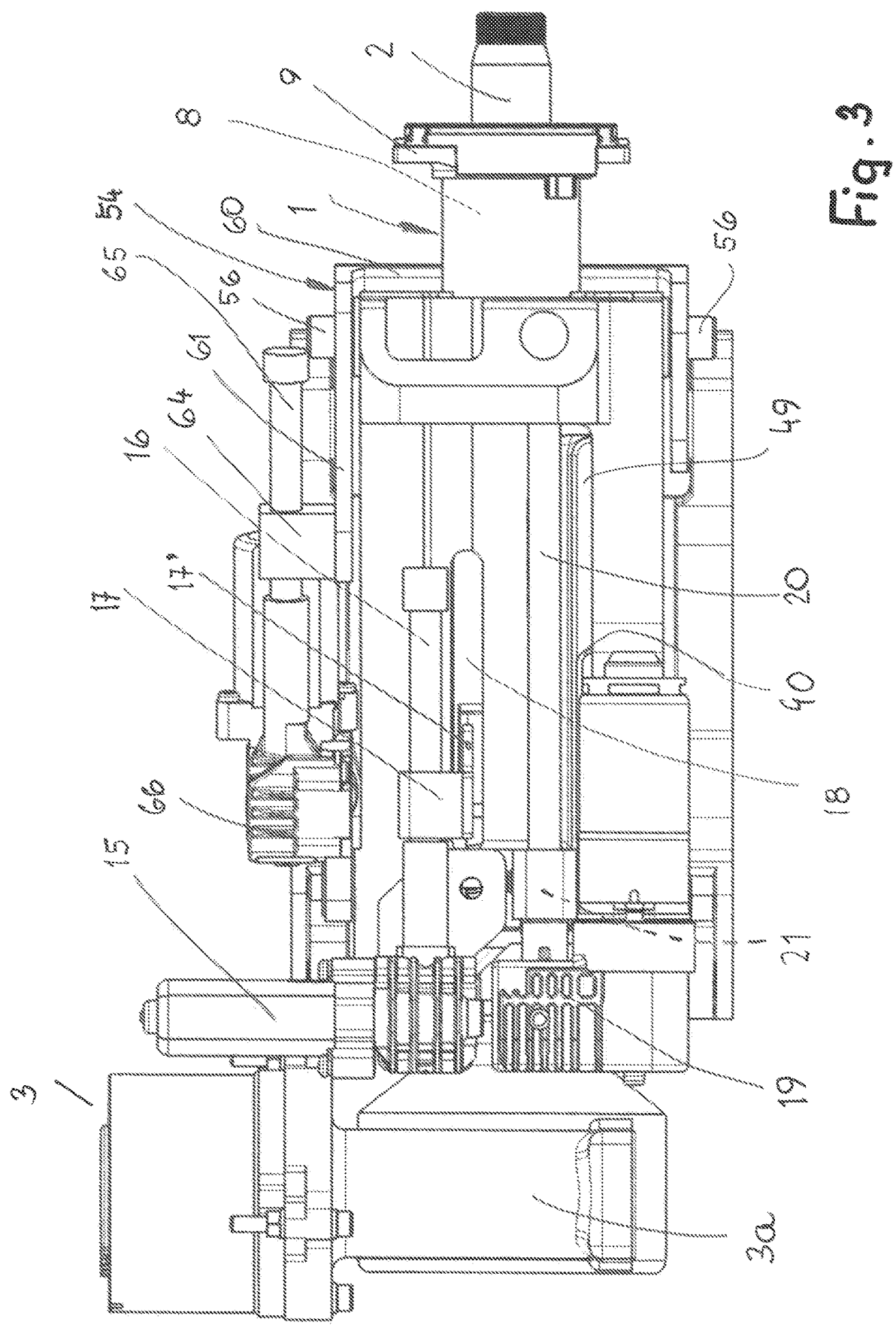
FIG. 3 is a top view of the steering column adjustment device in accordance with FIG. 1.

The drive nut 17 is firmly connected to the inner guide tube 8, which is displaced in the respective direction relative to the outer guide tube 7 depending on the movement direction of the drive nut 17 on the threaded spindle 16. The outer guide tube 7 is provided with an opening 18 extending in the axial direction (FIGS. 3, 4 and 8a), through which the drive nut 17 with a corresponding connecting part 17' projects. It is fastened to the outer side of the inner guide tube 8 with fastening elements 17a (FIG. 8a).

The length adjustment drive 15 is firmly connected to the inner guide tube 8, such that the length adjustment drive 15 is moved along with the inner guide tube 8 when the steering shaft 1 is adjusted in length.

Figure 2:
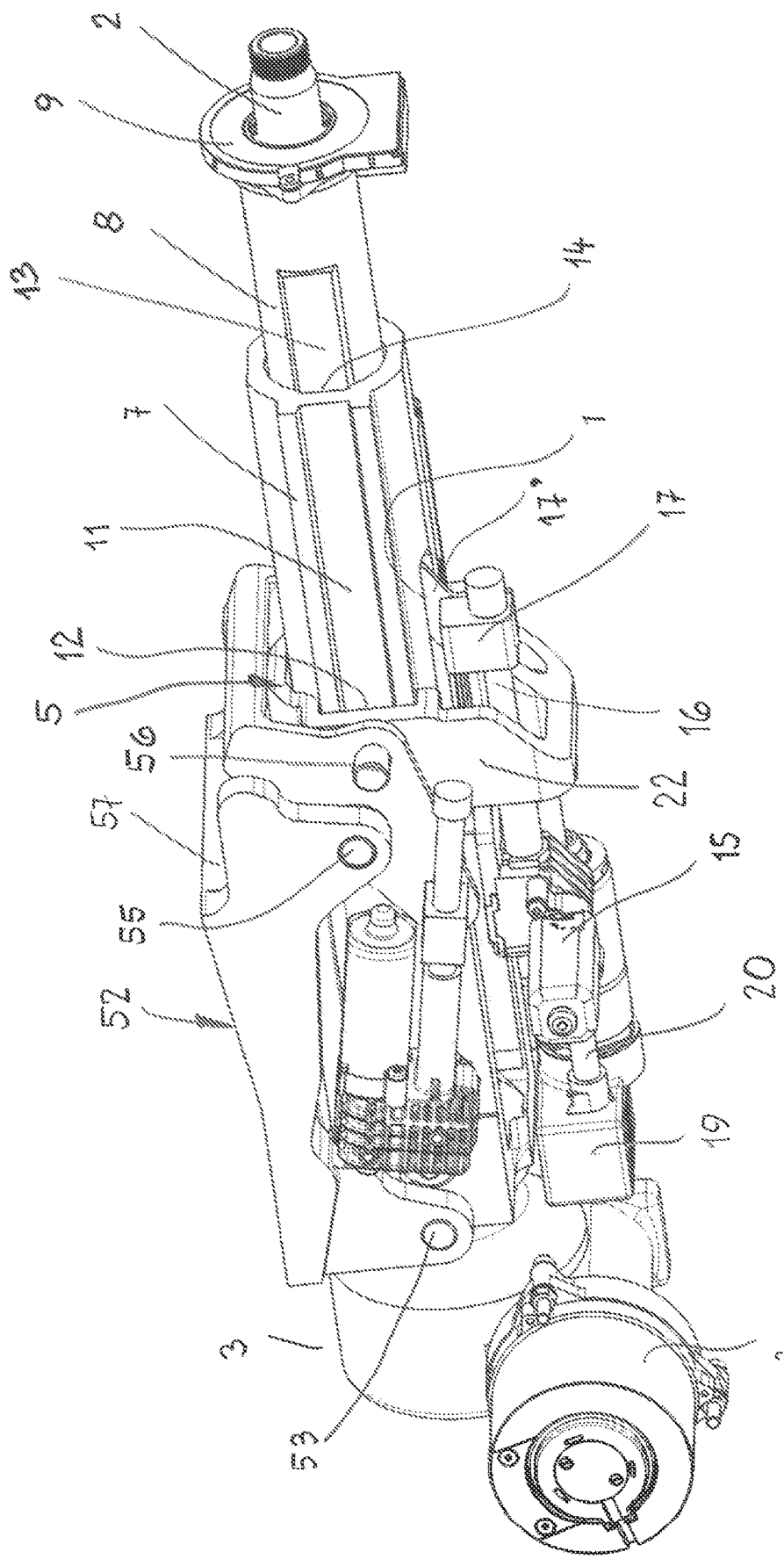
FIG. 2 is a perspective view of the steering column adjustment device in accordance with FIG. 1 with the steering spindle extended to its maximum.

A further length adjustment drive 19 (FIG. 2), which rotatably drives a threaded spindle 20 parallel to the threaded spindle 16, is used to displace the outer guide tube 7 in relation to the sheath tube 5. A drive nut 21 is seated on it and is axially fixed to the outer guide tube 7. The outer guide tube 7 can be displaced axially in relation to the sheath tube 5 using the drive nut 21.

In the driving position of the mechanism, the guide tube 7 is not displaced by the length adjustment drive 19. The guide tube 7 is held in the driving position by the selflocking mechanism of the transmission 20, 21, which is advantageous for a crash function yet to be described.

The end of the threaded spindle 20 turned away from the length adjustment drive 19 is rotatably mounted in a radial extension 22 of the sheath tube 5 (FIGS. 1, 2 and 6 to 11).

The drive nut 21 projects through an axial opening 23 in the sheath tube 5 (FIG. 10) in a manner to be described with a connecting part 36.

In contrast to the length adjustment drive 15, the length adjustment drive 19 is arranged in a fixed position, such that its position does not change in relation to the adjustment device when the length of the steering shaft 1 is adjusted.

FIG. 11 shows the steering shaft 1 in its retracted position. The outer guide tube 7 is almost completely retracted into the sheath tube 5 by means of the length adjustment drive 19. The drive nut 21 is located on the threaded spindle 20 in its left-hand starting position shown in FIG. 11. The inner guide tube 8 is retracted into the outer guide tube 7 to such an extent that it only protrudes a short length from the outer guide tube 7. The steering spindle 2 is connected to the inner guide tube 8 in such a manner that it protrudes beyond both ends of the inner guide tube 8. In the retracted position of the inner guide tube 8, the steering spindle 2 also projects axially beyond the outer guide tube 7 in the direction of the drive 3.

The steering spindle 2 can be displaced from such stowed position shown in FIG. 11 to the maximum extended position shown in FIG. 11 with the aid of the two length adjustment drives 15, 19. Starting from the stowed position in accordance with FIG. 11, the outer guide tube 7 can first be displaced in relation to the sheath tube 5 by means of the length adjustment drive 19 via the drive nut 21.

Figure 4:
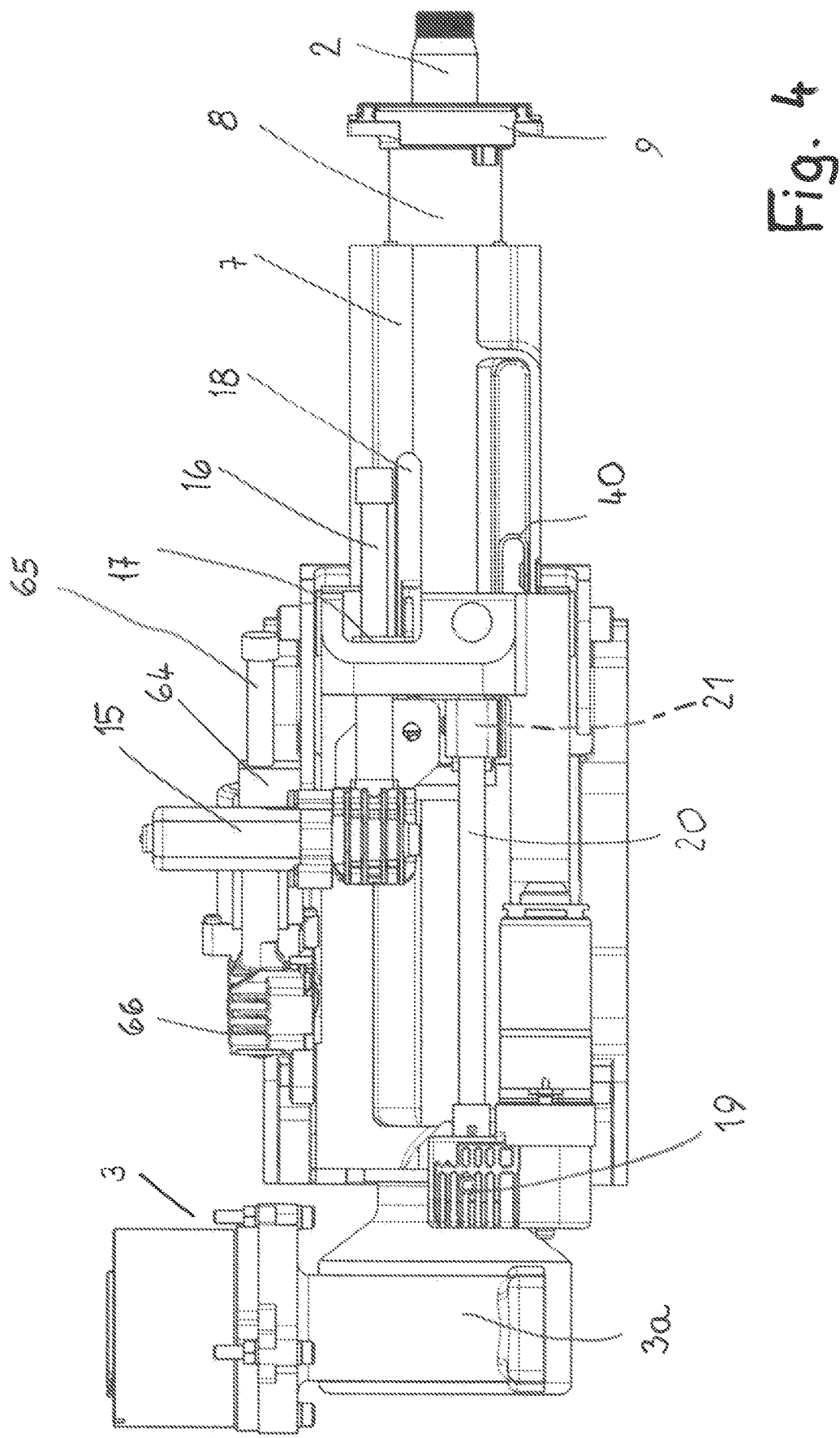
FIG. 4 is a top view of the steering column adjustment device with the steering spindle extended partially.
Figure 5:
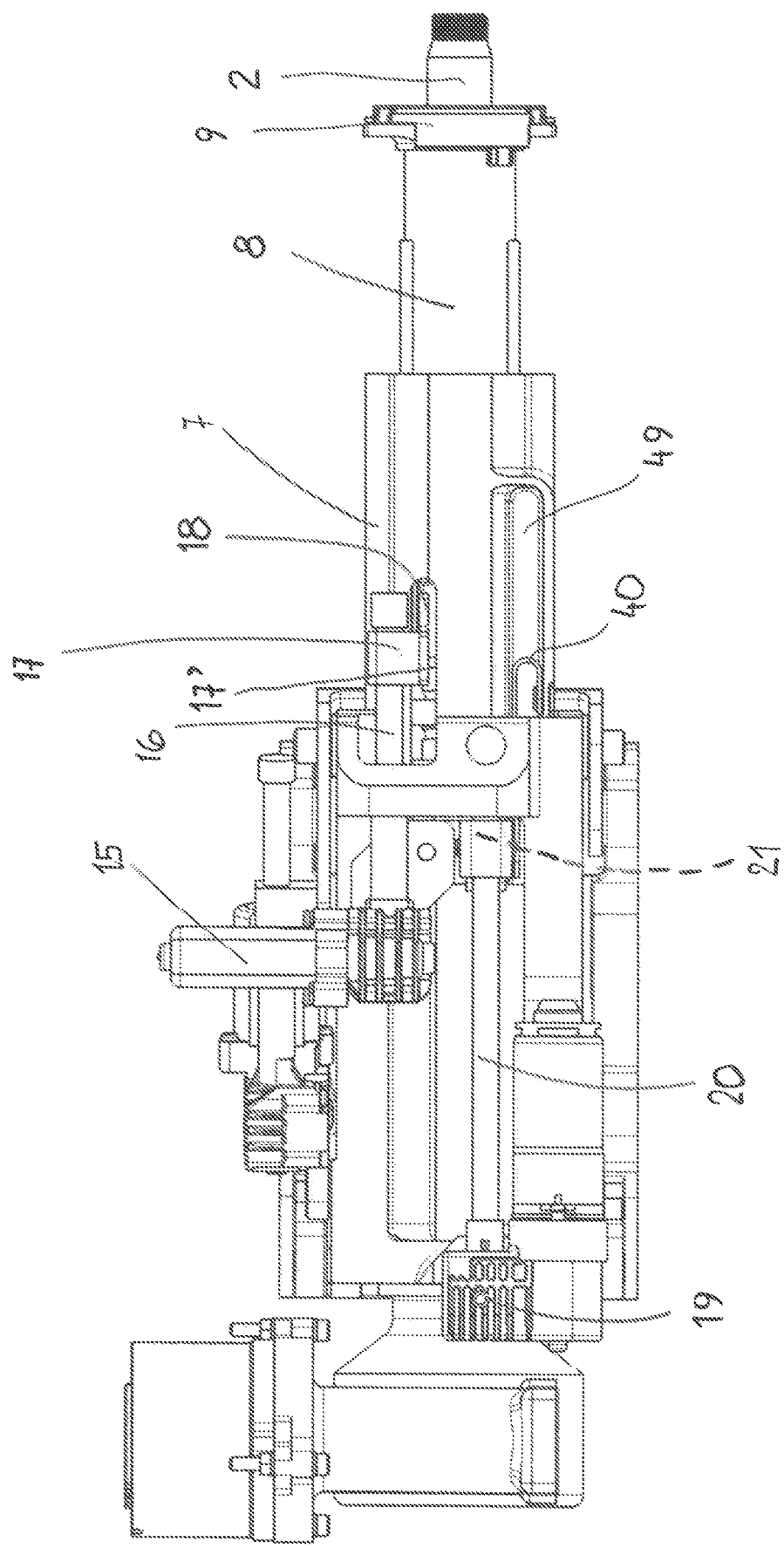
FIG. 5 is a top view of the steering column adjustment device in accordance with FIG. 2.

At the same time, the adjustment drive 15 moves the inner guide tube 8 together with the steering spindle 2. In this manner, both guide tubes 7, 8 can be moved into an intermediate position, which is shown in FIG. 4.

The described adjustment achieves an intermediate position in which the inner guide tube 8 is displaced together with the steering spindle 2 and the outer guide tube 7 is moved in relation to the sheath tube 5.

Starting from such intermediate position, the inner guide tube 8 can be displaced in relation to the outer guide tube 7 to the end position shown in FIGS. 5 and 7 to 10. This is achieved by moving the drive nut 17 along the threaded spindle 16 with the length adjustment drive 15, as a result of which the inner guide tube 8 with the steering spindle 2 is moved out of the outer guide tube 7 into the end position.

Figure 13:
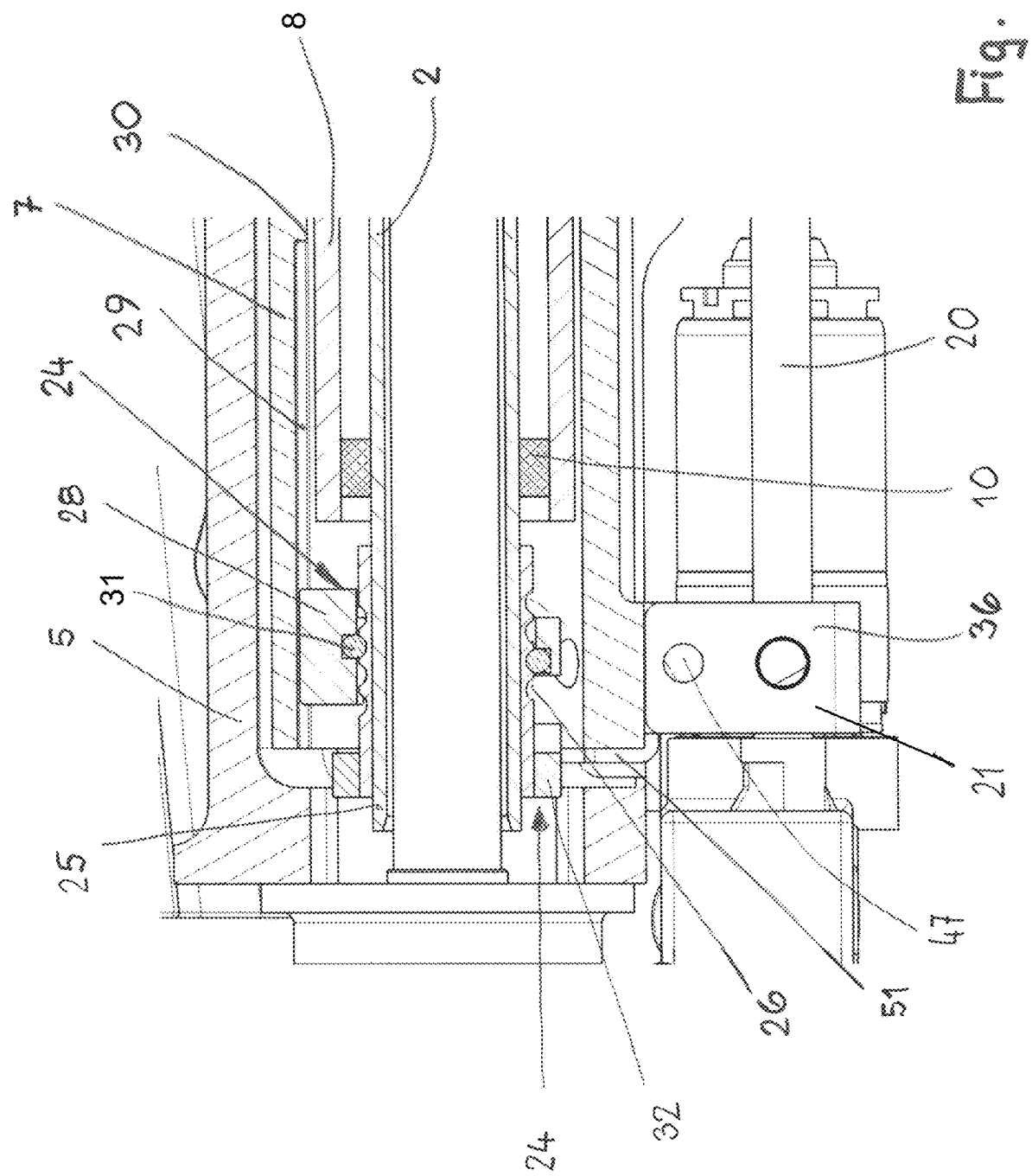
FIG. 13 and FIG. 14 shows enlarged representations of sections from FIGS. 10 and 11.
Figure 14:
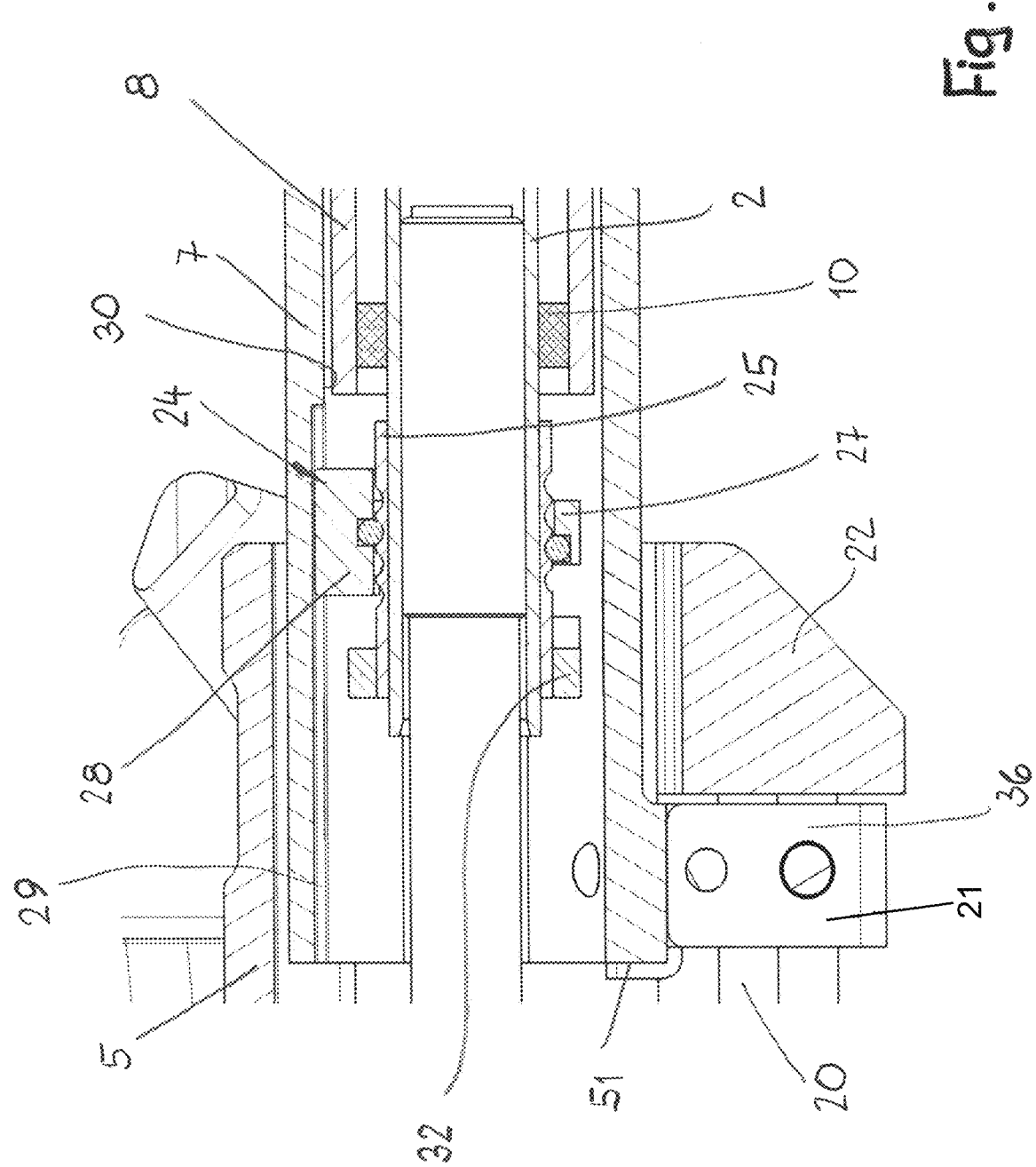
Figure 15:
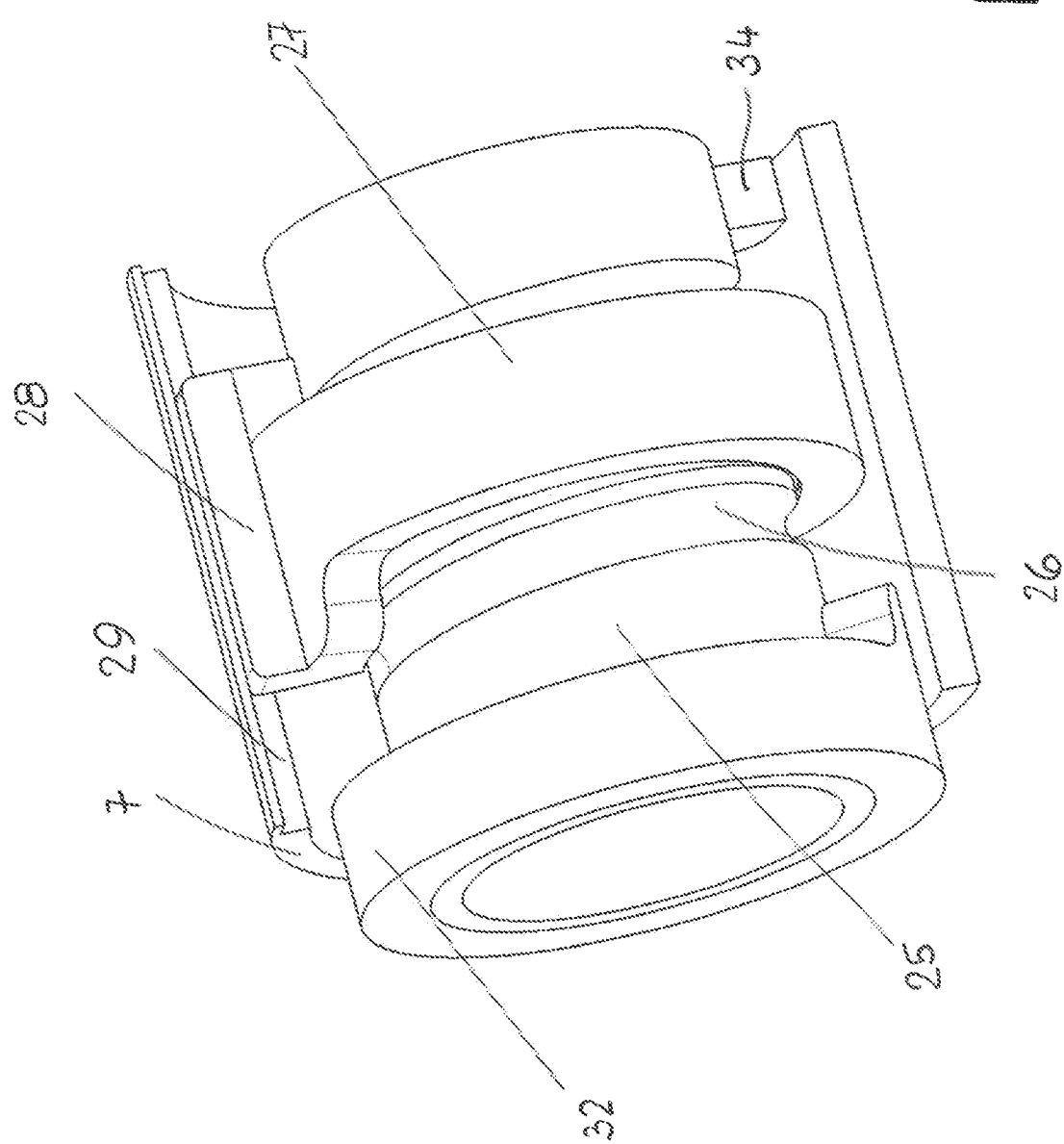
FIGS. 15 to 17 show, in each case in perspective representation and partially in sectional view, different positions of a ball nut of a stop device of the steering column adjustment device.

In the region outside the inner guide tube 8, the outer guide tube 7 is connected to the steering spindle 2 via a stop device 24. The stop device 24 has a grooved sleeve 25, which is fastened to the end of the steering spindle 2 that protrudes inwards beyond the inner guide tube 8 (FIGS. 13 and 14). The grooved sleeve 25 is provided with a coiled groove 26. The groove sleeve 25 is surrounded by a ball nut 27 (FIG. 14), from which a guide element 28 protrudes radially, which engages in an axially extending guide 29 in the inner wall 30 of the outer guide tube 7 (FIGS. 13 to 17).

Rolling balls 31, which engage in the groove 26, are located in the ball nut 27. The guide element 28 ensures that the ball nut 27 is not rotated about its axis when the steering spindle 2 is rotated. As a result of the engagement of the rolling balls 31 in the groove 26, the ball nut 27 is displaced axially.

Figure 16:
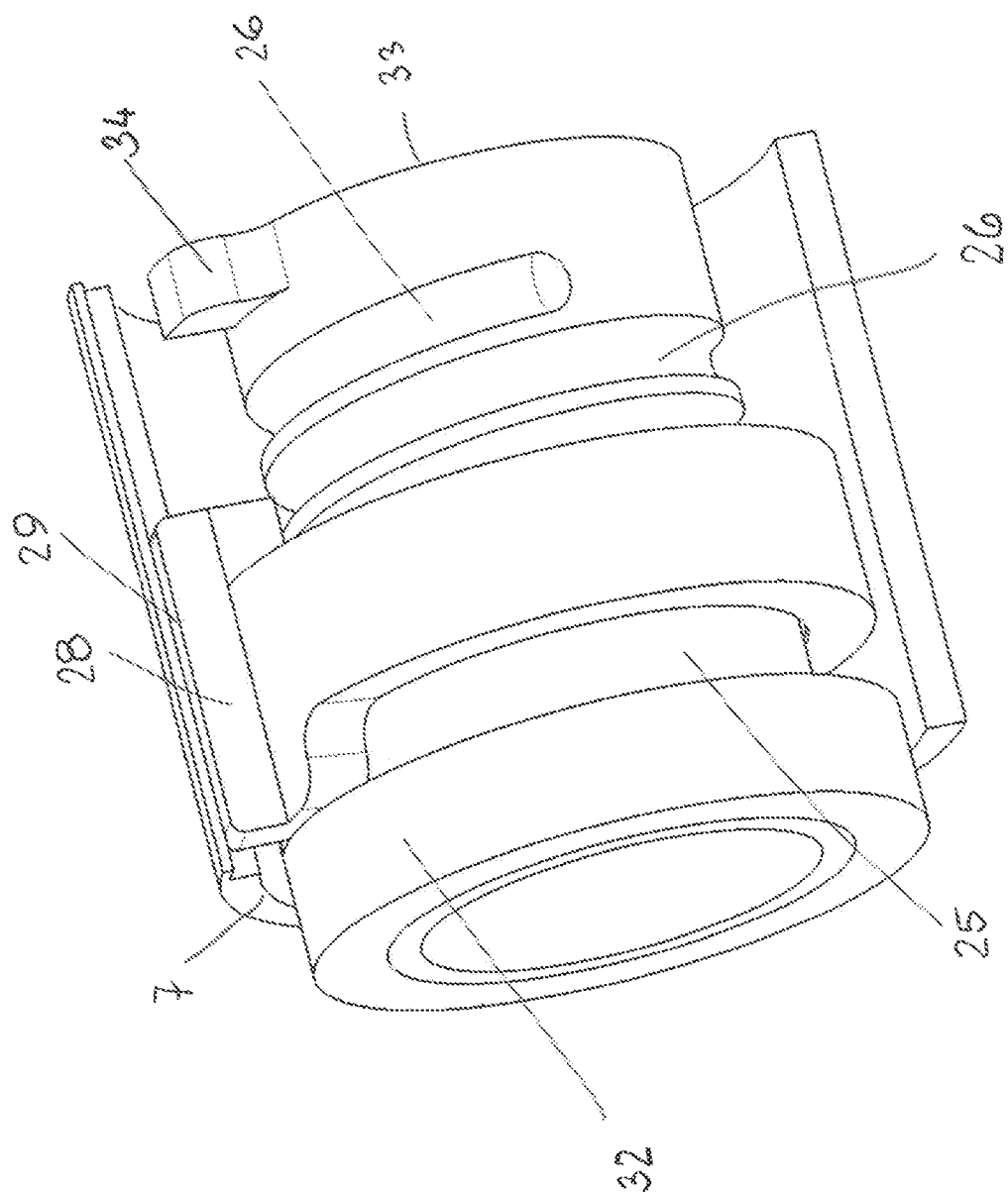

At its end turned towards the actuator 3, the groove sleeve 25 is provided with a stop ring 32, which is seated so that it cannot rotate on the groove sleeve 25 and against which the guide element 28 of the ball nut 27 comes to bear in an end position (FIG. 16).

As can be seen in FIG. 16, the helical groove 26 ends with a spacing from the end 33 of the ball nut 27 opposite the stop ring 32. At such end 33, the groove sleeve 25 is provided with a radially protruding stop 34, which can limit the movement path of the ball nut 27 along the groove sleeve 25.

The helical groove 26 extends over a total angular range of 540°, i.e. the groove sleeve 25 can perform a two-and-a-half rotation in relation to the ball nut 27.

In the position shown in FIG. 16, the ball nut 27 bears with its guide element 28 against the stop ring 32. In such position of the ball nut 27, the inner guide tube 8 together with the steering spindle 2 is pushed furthest out of the outer guide tube 7.

Figure 17:
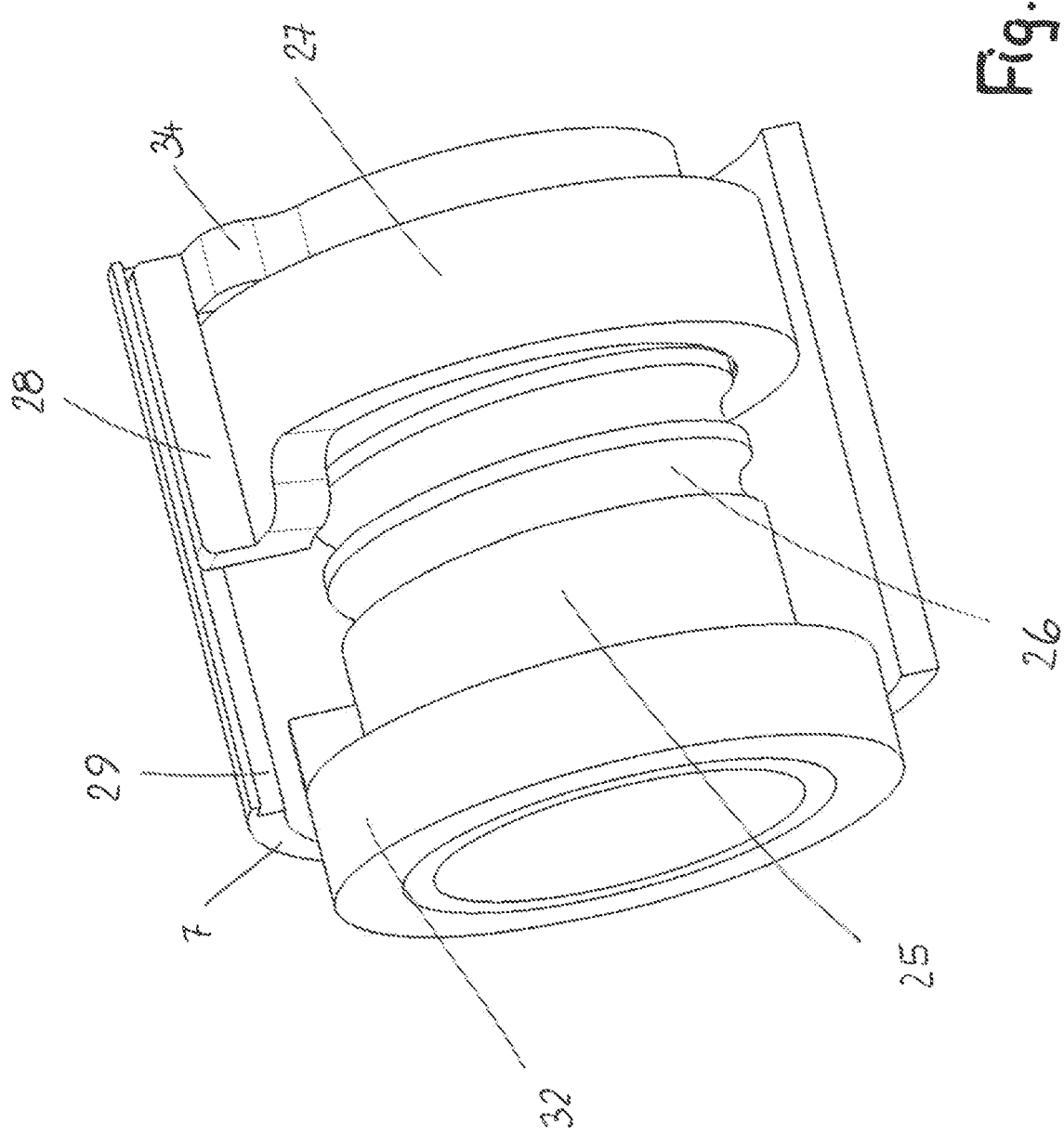

FIGS. 16 and 17 show the two end positions of the guide element 28 of the ball nut 27. In the one end position (FIG. 16), the guide element 28 bears against the stop ring 32. The other end position (FIG. 17) is reached if the ball nut 27 comes to bear against the stop 34.

The stop device 24 protects the adjustment device from overload torques after ±X° rotations of the steering wheel. The possible rotation angular range can be adapted in an advantageous manner.

Since the stop device 24 is provided at the end of the steering spindle 2 turned towards the actuator 3, it is protected within the adjustment device in any extended position of the steering shaft 1.

FIG. 10 shows the maximum length adjustment $L_{Vmax}$. The maximum adjustment length $L_{Vmax}$ is a measure of the maximum stowage space of the adjustment device. $Ü_A$ indicates the overlap of the toothed shaft 4 with the stop device 24 and $Ü_{Fa}$ indicates the overlap of the outer guide tube 7 with the sheath tube 5.

Figure 18:
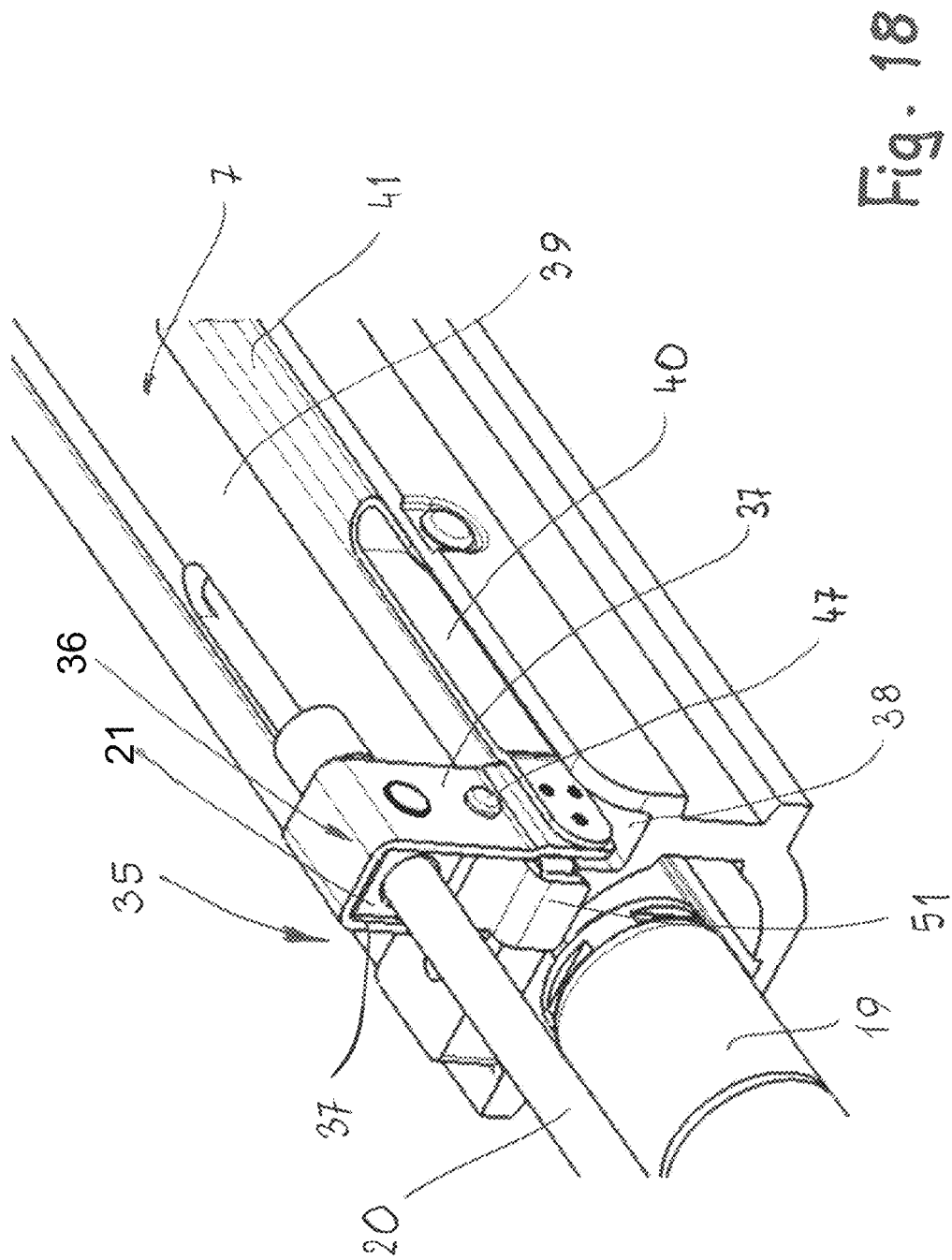
FIG. 18 is a perspective view of a safety unit of the steering column adjustment device.

The adjustment device is provided with a safety unit 35 (FIGS. 18 to 20), which serves as a crash device. The safety unit 35 has a U-shaped bracket 36 that surrounds the drive nut 17.

The one leg 37 of the bracket 36 projects into a recess 38 extending in the longitudinal direction of the outer guide tube 7, which is provided in the underside 39 in the region of a side wall of the inner guide tube 7. One end of an upright sheet metal strip 40, which is arranged in the recess 38, is fastened to the free end of the bracket leg 37. Following the bracket leg 37, the sheet metal strip 40 bears against a side wall 41 of the recess 38.

With a spacing from the bracket 36, the sheet metal strip 40 is bent by 180° and fastened with its other free end to the opposite side wall 42 of the recess 38. The two ends of the sheet metal strip 40 are spaced apart in the displacement direction of the guide tube 7. The end of the sheet metal strip 40 located on the side wall 42 is fastened to the side wall 42 of the recess 38 by means of a fastening element 43, which is a rivet in the exemplary embodiment. The head of the fastening element 43 is recessed in a recess 44 on the outer side 45 of the side wall 42.

The other end of the sheet metal strip 40 is fastened by three fastening elements 46 near the free end of the leg 37 of the bracket 36.

The bracket 36 is connected to the drive nut 17 by at least one shearing element 47. The shearing element 47 is advantageously a shear pin, which extends through the drive nut 17 in the region outside the threaded spindle 16 and protrudes with both ends over the legs 37 of the bracket 36 (FIG. 19).

Figure 19:
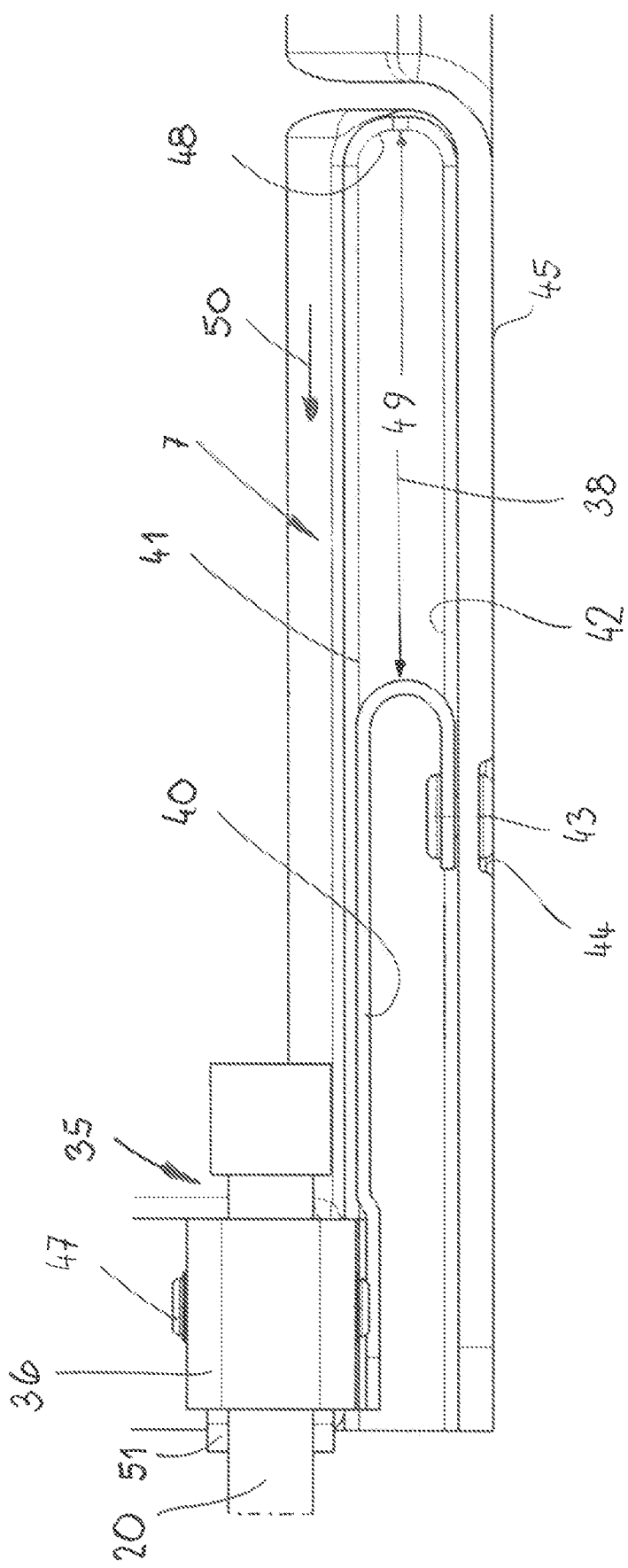
FIG. 19 is a top view of the safety unit in accordance with FIG. 18.

The region between the semi-circularly bent section of the sheet metal strip 40 and the correspondingly bent end region 48 of the recess 38 forms a deformation space 49 (FIG. 19). The arrow 50 in FIG. 19 indicates the direction of the crash. In the event of a crash, the bracket 36 and the sheet metal strip 40 firmly connected to it remain stationary, such that a relative displacement occurs between the bracket 36 and the outer guide tube 7. The result of this is a deformation of the sheet metal strip 40 (FIGS. 18a and 19a).

As can be seen from FIGS. 10, 11 and 18 to 20, the bracket 36 is provided with an L-shaped retaining element 51, which bears against the end face of the outer guide tube 7 turned towards the actuator 3. In the event of a crash, the retaining element 51 separates the drive nut 21 from the bracket 36 by shearing off the shearing element 47.

The steering column adjustment device is not only adjustable in the longitudinal direction, but also in the vertical direction. This is achieved by a pivot movement of the steering shaft 1 in the vertical direction.

The steering shaft 1 with the various drives is pivotably mounted on a bearing support 52 about an axle 53 (FIG. 1). The pivot axis 53 is perpendicular to the threaded spindles 16, 20 of the length adjustment drives 15, 19. The entire adjustment device is fastened in the vehicle with the bearing support 52. A U-shaped lever 54 is pivotably mounted on the bearing support 52 about an axis 55, which is parallel to the pivot axis 53. The sheath tube 5 is pivotably connected to the lever 54. The corresponding pivot axis 56 is parallel to the pivot axis 55.

The bearing support 52 has a cover plate 57 that covers the steering shaft 1 over most of its length. At one end of the cover plate 57, two tongues 58 parallel to each other protrude from the two longitudinal sides, of which only one tongue can be seen in the drawings. The two tongues 58 are located on both sides of the steering shaft 1, which is hinged to the tongues 58 near their free ends (pivot axis 53).

At the other end, further tongues 59 protrude from the longitudinal sides of the cover plate 57, which, like the tongues 58, extend from the cover plate 57 in the direction of the length adjustment drives 15, 19. Near the free ends of the tongues 59, the lever 54 is hinged in a manner pivoting about the axis 55.

The lever 54 has a connecting bar 60 (FIG. 1), which connects two legs 61, 62 parallel to each other. The two legs 61, 62 of the lever 54 are pivotably connected to the tongues 59 of the bearing support 52 via the pivot axis 55.

The two legs 61, 62 in each case have an elongated opening 63 (FIG. 6), through which the pivot axis 56 projects with clearance. It is formed by pins that protrude from the sheath tube 5 and extend through the openings 63.

A drive nut 64 is hinged to the free end of one leg 61. It is connected in an articulated manner to the leg 61 of the lever 54 about an axis parallel to the pivot axes 55, 56.

The drive nut 64 is seated on a threaded spindle 65, which is rotatably driven by a drive 66. It can be pivoted about an axis 67 (FIG. 6) parallel to the pivot axes 53, 55, 56. The drive 66 is connected to the actuator 3 via such pivot axis 67.

Figure 6:
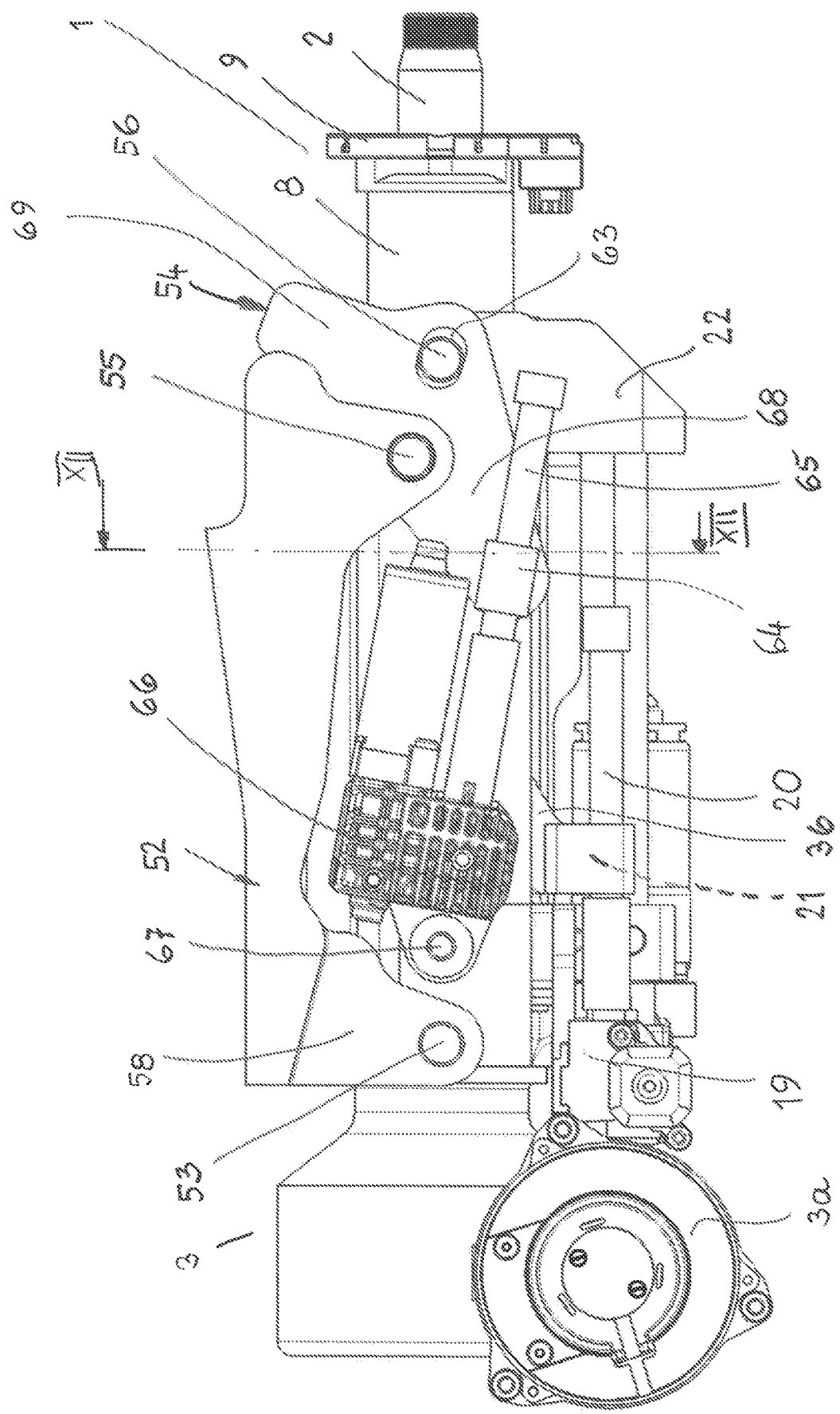
FIG. 6 is a side view of the steering column adjustment device in accordance with FIG. 1.

The pivot axis 55, with which the bearing support 52 and the lever 54 are connected to each other in an articulated manner, is located between the two pivot axes 53 and 56, as seen in side view in accordance with FIG. 6.

The lever 54, whose two legs 61, 62 are overlapped on the outside by the tongues 59 of the bearing support 52, has two lever arms 68, 69 (FIG. 6), which extend from the pivot axis 56 at an obtuse angle. The drive nut 64 engages near the free end of the lever arm 68.

Figure 7:
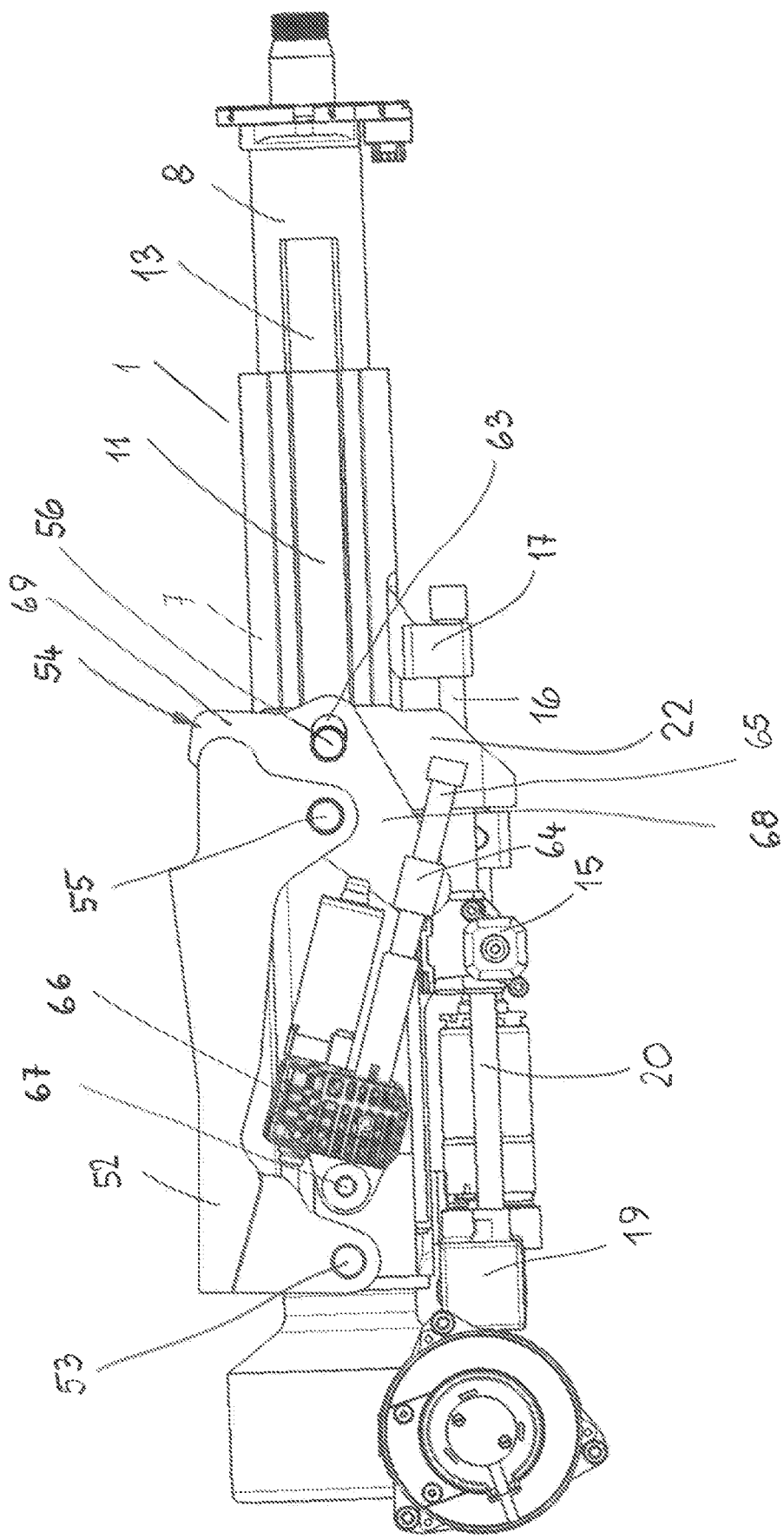
FIG. 7 is a side view of the steering column adjustment device in accordance with FIG. 2.

FIG. 7 shows the steering shaft 1 in its neutral position, in which the pivot axle 56 bears against the end of the elongated openings 63 turned towards the bearing support 52. The lever 54 is loaded by the drive nut 64 in such a manner that it bears against the pivot axis 56 under force in the manner described.

Figure 8:
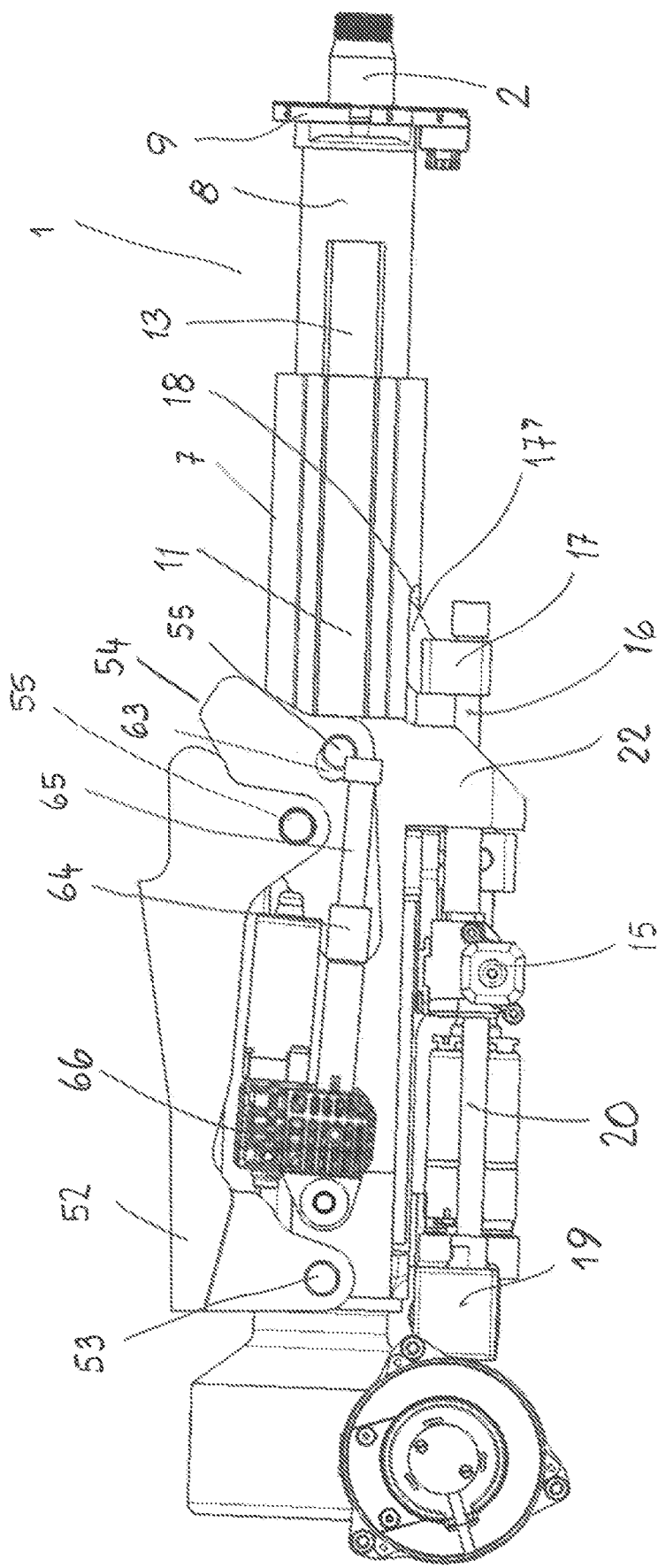
FIG. 8 is a representation corresponding to FIG. 7 of the steering column adjustment device in a first pivot position.

FIG. 8 shows the steering shaft in a downwardly pivoted position in relation to FIG. 7. In order to reach such lower pivot position, the threaded spindle 65 is rotated with the drive 66, such that the drive nut 64 is adjusted in the direction of the drive 66 up to the stop position shown in FIG. 8. As a result, the lever 54 is pivoted clockwise about the pivot axis 55. Thereby, the lever 54 also pivots about the pivot axis 55 in relation to the bearing support 52. With its end turned away from the pivot axis 55, the opening 63 bears under force against the lever 54, which is loaded accordingly by the drive nut 64. The steering shaft 1 itself can pivot about the pivot axis 53 into the position shown in FIG. 8.

Figure 9:
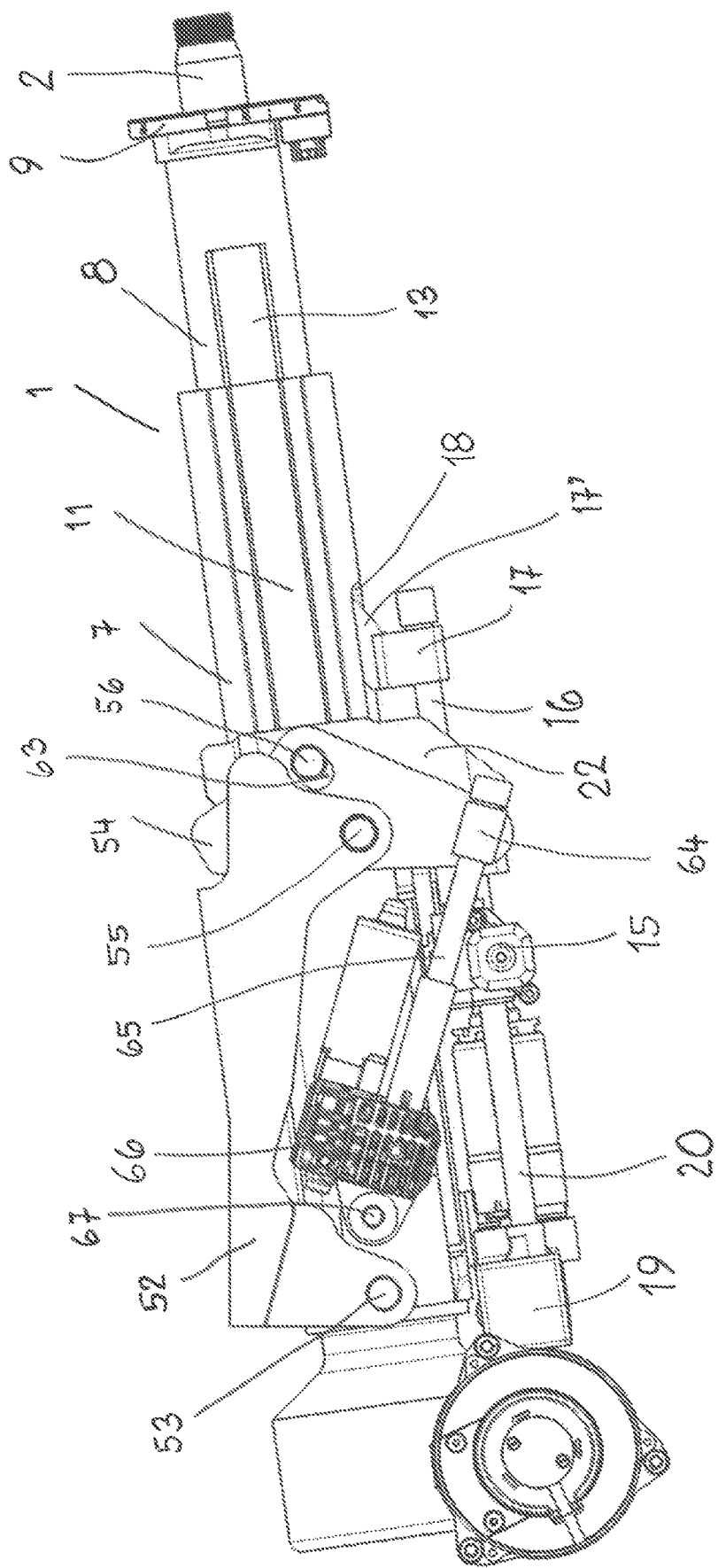
FIG. 9 shows the steering column adjustment device in accordance with FIG. 7 in a second pivoted position.

FIG. 9 shows the steering shaft 1 in an upwardly pivoted position in relation to the neutral position (FIG. 7). In order to achieve this, the threaded spindle 65 is rotated with the drive 66, such that the drive nut 64 moves in the direction of the free end of the threaded spindle 64. The lever 54 is pivoted counterclockwise about the axle 55 in relation to the bearing support 52. At the same time, the steering shaft 1 is pivoted upwards about the pivot axis 53. The pivot axis 56 bears under force on the end of the elongated opening 63 of the lever 54 turned away from the pivot axis 55.

The drive 66 with the threaded spindle 65 is pivoted about the axle 67 relative to the steering shaft 1 and the bearing support 52 during the corresponding pivoting movements.

The arrangement can be such that the pivot angle of the steering shaft 1 is greater during the upward pivot movement than during the downward pivot movement. This can be achieved by designing the lever 54 accordingly, for example.

The steering column adjustment device described is characterized by its compact design. Nevertheless, a large length and height adjustment range is ensured. The two guide tubes 7, 8 can be adjusted in the described manner from the starting position (stowed position) shown in FIG. 1 very far into the maximum extended position, as shown as an example in FIG. 2. The telescopic design of the steering rod makes it possible for the adjustment device to have only a short length in the retracted position, but a long length in the extended position. This makes it possible, for example to get into the vehicle, to displace the steering element so far that the driver can get in comfortably. The long extension length means that the steering element can also be set to the optimum position for tall riders.

The compact design of the adjustment device is enhanced by the fact that the drives for at least the length adjustment of the steering rod 1 are arranged next to each other on the side opposite the bearing support 52. As a result, the drives 15, 19 take up very little installation space. The drive 66 for the height adjustment is also located in a space-saving manner directly next to the sheath tube 5 and, seen in top view (FIG. 3), directly next to the bearing support 52.

The invention claimed is:

1. An adjustment device for a steering column of a vehicle, comprising:
    a steering shaft (1) to which a steering element can be attached; and
    two drive units (15, 19) for adjusting a length of the steering shaft (1),
    wherein the steering shaft (1) comprises two tubes (7, 8), including an outer tube (7) and an inner tube (8), that engage into each other in a telescoping manner and can be displaced relative to each other,
wherein each of the two tubes (7, 8) is driven by a respective one of the drive units (15, 19),
wherein the two drive units (15, 19) are arranged next to each other in a region below the steering shaft (1),
wherein the two drive units (15, 19) each comprise a threaded spindle (16, 20) that can be driven in rotation, and
wherein a respective drive nut (21) that is drive-connected to a respective one of the two tubes (7, 8) is seated on each of the threaded spindles (16, 20).

2. The adjustment device according to claim 1,
wherein the threaded spindles (16, 20) are parallel to each other.

3. The adjustment device according to claim 1,
wherein the two tubes (7, 8) can be displaced in a sheath tube (5).

4. The adjustment device according to claim 1,
wherein the outer tube (7) is drive-connected to the inner tube (8) via a crash element (40).

5. The adjustment device according to claim 4,
wherein one end of the crash element (40) is connected to a connecting element (36) connected to a drive nut (21) of the drive unit (19) for the outer tube (7).

6. The adjustment device according to claim 5,
wherein the connecting element (36) is connected to the drive nut (21) via at least one shearing element (47).

7. An adjustment device for a steering column of a vehicle, comprising:
a steering shaft (1) to which a steering element can be attached; and
two drive units (15, 19) for adjusting a length of the steering shaft (1),
wherein the steering shaft (1) comprises two tubes (7, 8), including an outer tube (7) and an inner tube (8), that engage into each other in a telescoping manner and can be displaced relative to each other,
wherein each of the two tubes (7, 8) is driven by a respective one of the drive units (15, 19),
wherein the two drive units (15, 19) are arranged next to each other in a region below the steering shaft (1),
wherein the two tubes (7, 8) can be displaced in a sheath tube (5), and
wherein the outer tube (7) has, on an inner side (30) thereof, at least one axial guide (29) for the inner tube (8).

8. The adjustment device according to claim 7,
wherein a steering spindle (2) is rotatably supported in the inner tube (8) by a bearing arrangement (10).

9. The adjustment device according to claim 8,
wherein the steering shaft (1) can be adjusted in a vertical direction.

10. The adjustment device according to claim 9,
wherein an adjusting unit (66) for height adjustment is pivotably mounted on a bearing support (52) about an axis (67) that is transverse to a longitudinal adjustment direction of the steering spindle (2).

11. The adjustment device according to claim 10,
wherein a lever (54) is pivotably mounted on the bearing support (52) and is pivotably connected to the sheath tube (5).

12. The adjustment device according to claim 11,
wherein the adjusting unit (66) engages on the lever (54).

13. The adjustment device according to claim 11,
wherein the adjusting unit (66) has a threaded spindle (65) that can be driven in rotation and on which a drive nut (64) that is coupled to the lever (54) is seated.

14. The adjustment device according to claim 8,
wherein a stop device (24) is seated on an end of the steering spindle (2) that protrudes axially beyond the inner tube (8) and has at least one guide element (28) that engages in the axial guide (29) of the outer tube (7).

15. The adjustment device according to claim 14,
wherein the stop device (24) has a groove sleeve (25) that is seated on the steering spindle (2) and has a helically extending groove (26), in which the guide element (28) engages with at least one engagement element (31).

16. The adjustment device according to claim 15,
wherein the at least one engagement element (31) is a plurality of rolling balls.

17. The adjustment device according to claim 15,
wherein the helically extending groove (26) extends over an angular range of more than 360°.

18. An adjustment device for a steering column of a vehicle, comprising:
a steering shaft (1) to which a steering element can be attached; and
two drive units (15, 19) for adjusting a length of the steering shaft (1),
wherein the steering shaft (1) comprises two tubes (7, 8), including an outer tube (7) and an inner tube (8), that engage into each other in a telescoping manner and can be displaced relative to each other,
wherein each of the two tubes (7, 8) is driven by a respective one of the drive units (15, 19),
wherein the two drive units (15, 19) are arranged next to each other in a region below the steering shaft (1),
wherein the outer tube (7) is drive-connected to the inner tube (8) via a crash element (40), and
wherein the crash element (40) is a sheet metal strip.

* * * * *